(12) United States Patent
Lu et al.

(10) Patent No.: US 10,993,004 B2
(45) Date of Patent: Apr. 27, 2021

(54) OPTICAL DEVICE AND OPTICAL SIGNAL PROCESSING METHOD

(71) Applicant: HUAWEI TECHNOLOGIES CO., LTD., Shenzhen (CN)

(72) Inventors: Yanzhao Lu, Dongguan (CN); Xie Wang, Shenzhen (CN); Liangchuan Li, Dongguan (CN); Shupeng Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/986,888

(22) Filed: Aug. 6, 2020

(65) Prior Publication Data

US 2020/0366977 A1 Nov. 19, 2020

Related U.S. Application Data

(63) Continuation of application No. PCT/CN2018/101356, filed on Aug. 20, 2018.

(30) Foreign Application Priority Data

Feb. 8, 2018 (CN) .......................... 201810126437.8

(51) Int. Cl.
*H04B 10/04* (2006.01)
*H04Q 11/00* (2006.01)
(Continued)

(52) U.S. Cl.
CPC .......... *H04Q 11/0005* (2013.01); *G02F 1/21* (2013.01); *H04B 10/802* (2013.01);
(Continued)

(58) Field of Classification Search
CPC .. H04B 10/516; H04B 10/532; H04B 10/541; H04B 10/548; H04B 10/40;
(Continued)

(56) References Cited

U.S. PATENT DOCUMENTS 6,259,836 B1 7/2001 Dodds
7,369,715 B2 5/2008 Darcie et al.
(Continued)

FOREIGN PATENT DOCUMENTS

CN 1926791 A 3/2007
CN 103091072 A 5/2013
(Continued)

OTHER PUBLICATIONS

Qing Ting et al., "Optical vector analysis based on asymmetrical optical double-sideband modulation using a dual-drive dual-parallel Mach-Zehnder modulator", optical express Mar. 6, 2017 total 7 pages.

(Continued)

*Primary Examiner* — Hanh Phan
(74) *Attorney, Agent, or Firm* — Stein IP, LLC

(57) ABSTRACT

A first optical splitter splits a light source to obtain a first optical signal, a second optical signal, and a third optical signal. A first MZ modulator modulates the first optical signal to output a fourth optical signal. A second MZ modulator modulates the second optical signal to output a fifth optical signal. A first optical coupler couples the fourth optical signal and the fifth optical signal to output a sixth optical signal and a seventh optical signal. A power regulator and a phase shifter respectively perform power adjustment and phase shifting on the third optical signal to output an eighth optical signal. A second optical splitter splits the eighth optical signal into a ninth optical signal and a tenth optical signal. A second optical coupler combines the sixth optical signal and the ninth optical signal. A third optical coupler combines the seventh optical signal and the tenth optical signal.

18 Claims, 28 Drawing Sheets

(51) Int. Cl.
  *G02F 1/21* (2006.01)
  *H04B 10/80* (2013.01)
  *H04L 7/00* (2006.01)
(52) U.S. Cl.
  CPC ...... *H04L 7/0075* (2013.01); *G02F 2001/212* (2013.01); *H04Q 2011/0015* (2013.01); *H04Q 2011/0049* (2013.01)
(58) Field of Classification Search
  CPC ............ H04B 10/5161; H04B 10/5561; H04B 10/6163; H04B 10/616; H04B 10/61; H04B 10/614; H04B 10/6165; H04B 10/6164; H04B 10/50572; H04B 10/50577; H04B 10/564; H04J 14/02; H04J 14/06
  USPC ....... 398/183, 188, 184, 158, 159, 135, 136, 398/202, 204, 205, 208, 209, 192, 193, 398/194, 195, 65, 152, 79, 196, 197, 198
  See application file for complete search history.

(56) References Cited

U.S. PATENT DOCUMENTS

| | | | |
|---|---|---|---|
| 2004/0184819 A1* | 9/2004 | Vassilieva | H04B 10/505 398/188 |
| 2007/0065161 A1* | 3/2007 | Miura | H04B 10/5053 398/186 |
| 2011/0158577 A1 | 6/2011 | Doerr | |
| 2012/0230694 A1 | 9/2012 | Tanaka et al. | |
| 2016/0099776 A1* | 4/2016 | Nakashima | H04B 10/541 398/186 |

FOREIGN PATENT DOCUMENTS

| | | |
|---|---|---|
| CN | 103842895 A | 6/2014 |
| CN | 105162523 A | 12/2015 |
| CN | 105676206 A | 6/2016 |
| CN | 106027153 A | 10/2016 |
| WO | 2006080168 A1 | 8/2006 |

OTHER PUBLICATIONS

Qin Weize et al., "The performance analysis of microwave photonic frequency conversion using double-sideband suppressed-carrier and balance detection", 2015 IEEE International Conference on Communication Problem-Solving, Dec. 31, 2015, total 4 pages.

Jiang Li et al, "Extract Synchronization Carrier form DSB-SC Signal Us ing Simulink", Computer Knowledge and Technology (Academic Exchange) vol. 1 Issue 6, May 21, 2007, total 6 pages. With an English Abstract.

* cited by examiner

CONT.
FROM
FIG. 12A

Combine the seventh optical signal and the tenth optical signal, to obtain a twelfth optical signal with a frequency f0 – f and cancel a residual signal of the seventh optical signal at f0 — S1108

Modulate the eleventh optical signal — S1109a

Modulate the twelfth optical signal — S1110a

Couple the modulated eleventh optical signal and the modulated twelfth optical signal into a thirteenth optical signal, and output the thirteenth optical signal — S1111a

FIG. 12B

CONT.
FROM
FIG. 13A

Combine the seventh optical signal and the tenth optical signal, to obtain a twelfth optical signal with a frequency f0 – f and cancel a residual signal of the seventh optical signal at f0  — S1108 

Modulate the eleventh optical signal — S1109b 

Modulate the twelfth optical signal — S1110b 

Modulate the fourteenth optical signal — S1111b 

Couple the modulated eleventh optical signal, the modulated twelfth optical signal, and the modulated fourteenth optical signal into a fifteenth optical signal, and output the fifteenth optical signal — S1112b 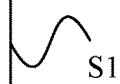

FIG. 13B

CONT.
FROM
FIG. 14A

Combine the seventh optical signal and the tenth optical signal, to obtain a twelfth optical signal with a frequency f0 − f and cancel a residual signal of the seventh optical signal at f0 — S1108

Receive a first optical carrier, and perform coherent detection on the eleventh optical signal and the first optical carrier to obtain a first coherent detection signal — S1109c Perform analog-to-digital conversion on the first coherent detection signal to obtain a first digital signal — S1110c Receive a second optical carrier, and perform coherent detection on the twelfth optical signal and the second optical carrier to obtain a second coherent detection signal — S1111c Perform analog-to-digital conversion on the second coherent detection signal to obtain a second digital signal — S1112c Process the first digital signal and the second digital signal — S1113c

FIG. 14B

CONT.
FROM
FIG. 17A

Combine the sixth optical signal and the tenth optical signal, to obtain a twelfth optical signal with a frequency f0 + f and cancel a residual signal of the sixth optical signal at f0  S1608

Combine the seventh optical signal and the eleventh optical signal, to obtain a thirteenth optical signal with a frequency f0 − f and cancel a residual signal of the seventh optical signal at f0  S1609

Modulate the twelfth optical signal 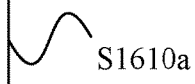 S1610a

Modulate the thirteenth optical signal 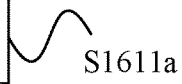 S1611a

Couple the modulated twelfth optical signal and the modulated thirteenth optical signal into a fourteenth optical signal, and output the fourteenth optical signal 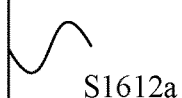 S1612a

FIG. 17B

CONT.
FROM
FIG. 18A

Combine the sixth optical signal and the tenth optical signal, to obtain a twelfth optical signal with a frequency f0 + f and cancel a residual signal of the sixth optical signal at f0 — S1608 

Combine the seventh optical signal and the eleventh optical signal, to obtain a thirteenth optical signal with a frequency f0 − f and cancel a residual signal of the seventh optical signal at f0 — S1609 

Modulate the twelfth optical signal — S1610b 

Modulate the thirteenth optical signal — S1611b 

Modulate the fifteenth optical signal — S1612b 

Couple the modulated twelfth optical signal, the modulated thirteenth optical signal, and the modulated fifteenth optical signal into a sixteenth optical signal, and output the sixteenth optical signal — S1613b 

FIG. 18B

CONT.
FROM
FIG. 19A

Combine the sixth optical signal and the tenth optical signal, to obtain a twelfth optical signal with a frequency f0 + f and cancel a residual signal of the sixth optical signal at f0  S1608

Combine the seventh optical signal and the eleventh optical signal, to obtain a thirteenth optical signal with a frequency f0 − f and cancel a residual signal of the seventh optical signal at f0  S1609

Receive a first optical carrier, and perform coherent detection on the twelfth optical signal and the first optical carrier to obtain a first coherent detection signal  S1610c Perform analog-to-digital conversion on the first coherent detection signal to obtain a first digital signal  S1611c Receive a second optical carrier, and perform coherent detection on the thirteenth optical signal and the second optical carrier to obtain a second coherent detection signal  S1612c Perform analog-to-digital conversion on the second coherent detection signal to obtain a second digital signal  S1613c Process the first digital signal and the second digital signal  S1614c

FIG. 19B

CONT.
FROM
FIG. 20A

| Combine the seventh optical signal and the eleventh optical signal, to obtain a thirteenth optical signal with a frequency f0 − f and cancel a residual signal of the seventh optical signal at f0 | S1609 |

| Receive a first optical carrier, and perform coherent detection on the twelfth optical signal and the first optical carrier to obtain a first coherent detection signal | S1610c |

| Perform analog-to-digital conversion on the first coherent detection signal to obtain a first digital signal | S1611c |

| Receive a second optical carrier, and perform coherent detection on the thirteenth optical signal and the second optical carrier to obtain a second coherent detection signal | S1612c |

| Perform analog-to-digital conversion on the second coherent detection signal to obtain a second digital signal | S1613c |

| Process the first digital signal and the second digital signal | S1614c |

| Receive a third optical carrier, and perform coherent detection on the seventeenth optical signal and the third optical carrier to obtain a third coherent detection signal | S1615c |

| Perform analog-to-digital conversion on the third coherent detection signal to obtain a third digital signal | S1616c |

| Process the third digital signal | S1617c |

FIG. 20B

OPTICAL DEVICE AND OPTICAL SIGNAL PROCESSING METHOD

CROSS-REFERENCE TO RELATED APPLICATIONS

This application is a continuation of International Application No. PCT/CN2018/101356, filed on Aug. 20, 2018, which claims priority to Chinese Patent Application No. 201810126437.8, filed on Feb. 8, 2018. The disclosures of the aforementioned applications are hereby incorporated by reference in their entireties.

TECHNICAL FIELD

Embodiments of the present invention relate to communications technologies, and in particular, to an optical device and an optical signal processing method.

BACKGROUND

With continuous development of communications technologies, a communications system has increasingly high requirements for a transmission bandwidth and a capacity of an optical fiber transmission technology. To meet the bandwidth and capacity requirements, a multichannel transmission technology emerges.

For example, in the prior art, an optical frequency shifter is provided, including: one input port, a 1-input 2-output optical coupler connected to the one input port, two Mach-Zehnder (Mach Zehnder, MZ) modulators optically connected to two output ends of the 1-input 2-output optical coupler respectively, a 2-input 2-output optical coupler optically connected to output ends of the two MZ modulators, and two output optical ports connected to two output ends of the 2-input 2-output optical coupler.

The optical frequency shifter uses a dual channel output technology. Because of problems such as an extinction ratio and bias control of the MZ modulator, carrier leakage may occur on both channels, and consequently quality of an output signal is not high.

SUMMARY

Aspects of this application provide an optical device and an optical signal processing method, to improve quality of an output signal.

According to a first aspect, this application provides an optical device, including:

a first optical splitter, configured to split a light source with a frequency f0, to form at least three optical signals, where the at least three optical signals include a first optical signal, a second optical signal, and a third optical signal;

a first MZ modulator, configured to drive the first optical signal based on a first clock signal $\cos(2\pi ft)$ to modulate the first optical signal, to output a fourth optical signal, where f represents a frequency of the first clock signal;

a second MZ modulator, configured to drive the second optical signal based on a second clock signal $\sin(2\pi ft)$ to modulate the second optical signal, to output a fifth optical signal;

a first optical coupler, configured to couple the fourth optical signal and the fifth optical signal to output a sixth optical signal and a seventh optical signal;

a power regulator and a phase shifter, configured to respectively perform power adjustment and phase shifting on the third optical signal to output an eighth optical signal;

a second optical splitter, configured to split the eighth optical signal into a ninth optical signal and a tenth optical signal;

a second optical coupler, configured to combine the sixth optical signal and the ninth optical signal, to output an eleventh optical signal with a frequency f0+f and cancel a residual signal of the sixth optical signal at f0; and a third optical coupler, configured to combine the seventh optical signal and the tenth optical signal, to output a twelfth optical signal with a frequency f0−f and cancel a residual signal of the seventh optical signal at f0.

A beneficial effect of this application is as follows. The ninth optical signal and the tenth optical signal cancel the residual signal of the sixth optical signal at f0 and the residual signal of the seventh optical signal at f0 respectively. In this way, quality of an output signal can be improved.

Optionally, the first clock signal and the second clock signal are generated by a same clock source, or the first clock signal and the second clock signal are generated by two phase synchronized clock sources.

Optionally, the optical device further includes:

a first modulator, configured to modulate the eleventh optical signal;

a second modulator, configured to modulate the twelfth optical signal; and a fourth optical coupler, configured to couple the modulated eleventh optical signal and the modulated twelfth optical signal into a thirteenth optical signal, and output the thirteenth optical signal.

A beneficial effect of this application is as follows. The optical device may combine the sixth optical signal and the ninth optical signal, to output the eleventh optical signal with the frequency f0+f and cancel the residual signal of the sixth optical signal at f0, and combine the seventh optical signal and the tenth optical signal, to output the twelfth optical signal with the frequency f0−f and cancel the residual signal of the seventh optical signal at f0. The optical device is further configured to modulate the eleventh optical signal and the twelfth optical signal, and couple the modulated eleventh optical signal and the modulated twelfth optical signal into the thirteenth optical signal. In this way, quality of an output signal is improved.

Optionally, the at least three optical signals further include a fourteenth optical signal, and the optical device further includes:

a third modulator, configured to modulate the eleventh optical signal;

a fourth modulator, configured to modulate the twelfth optical signal:

a fifth modulator, configured to modulate the fourteenth optical signal; and a fifth optical coupler, configured to couple the modulated eleventh optical signal, the modulated twelfth optical signal, and the modulated fourteenth optical signal into a fifteenth optical signal, and output the fifteenth optical signal.

A beneficial effect of this application is as follows. The finally coupled fifteenth optical signal may be divided into three subcarriers. The three subcarriers are formed through modulation performed by the third modulator, the fourth modulator, and the fifth modulator respectively. Therefore, multicarrier modulation in any manner can be implemented, to implement flexible modulation.

Optionally, the optical device further includes:

a first ICR, configured to receive a first optical carrier, and perform coherent detection on the eleventh optical signal and the first optical carrier to obtain a first coherent detection signal;

a first analog-to-digital converter ADC, configured to perform analog-to-digital conversion on the first coherent detection signal to obtain a first digital signal;

a second ICR, configured to receive a second optical carrier, and perform coherent detection on the twelfth optical signal and the second optical carrier to obtain a second coherent detection signal;

a second ADC, configured to perform analog-to-digital conversion on the second coherent detection signal to obtain a second digital signal; and a processor, configured to process the first digital signal and the second digital signal.

A beneficial effect of this application is as follows. The output eleventh optical signal and the output twelfth optical signal may be used as local oscillator light sources of the first ICR and the second ICR respectively. The first ICR and the second ICR receive the two carriers, perform the coherent detection on the corresponding carriers and the local oscillator light sources, and output the coherent detection signals to the first ADC and the second ADC respectively. The first ADC and the second ADC perform the analog-to-digital conversion on the corresponding coherent detection signals to obtain the first digital signal and the second digital signal respectively. The processor may separately process the first digital signal and the second digital signal, or may jointly process the first digital signal and the second digital signal, to achieve a beneficial effect of eliminating mutual crosstalk between two carriers with a frequency f0−f and a frequency f0+f.

Optionally, the at least three optical signals further include a sixteenth optical signal, and the optical device further includes:

a third ICR, configured to receive a third optical carrier, and perform coherent detection on the sixteenth optical signal and the third optical carrier to obtain a third coherent detection signal;

a third ADC, configured to perform analog-to-digital conversion on the third coherent detection signal to obtain a third digital signal; and the processor, further configured to process the third digital signal.

A beneficial effect of this application is as follows. The processor may separately process the first digital signal, the second digital signal, and the third digital signal, or may jointly process the first digital signal, the second digital signal, and the third digital signal, to achieve a beneficial effect of eliminating mutual crosstalk between some carriers.

According to a second aspect, this application provides an optical device, including:

a first optical splitter, configured to split a light source with a frequency f0, to form at least three optical signals, where the at least three optical signals include a first optical signal, a second optical signal, and a third optical signal;

a first MZ modulator, configured to drive the first optical signal based on a first clock signal $\cos(2\pi ft)$ to modulate the first optical signal, to output a fourth optical signal, where f represents a frequency of the first clock signal;

a second MZ modulator, configured to drive the second optical signal based on a second clock signal $\sin(2\pi ft)$ to modulate the second optical signal, to output a fifth optical signal;

a first optical coupler, configured to couple the fourth optical signal and the fifth optical signal to output a sixth optical signal and a seventh optical signal:

a second optical splitter, configured to split the third optical signal into an eighth optical signal and a ninth optical signal;

a first power regulator and a first phase shifter, configured to respectively perform power adjustment and phase shifting on the eighth optical signal to output a tenth optical signal:

a second power regulator and a second phase shifter, configured to respectively perform power adjustment and phase shifting on the ninth optical signal to output an eleventh optical signal;

a second optical coupler, configured to combine the sixth optical signal and the tenth optical signal, to output a twelfth optical signal with a frequency f0+f and cancel a residual signal of the sixth optical signal at f0; and a third optical coupler, configured to combine the seventh optical signal and the eleventh optical signal, to output a thirteenth optical signal with a frequency f0−f and cancel a residual signal of the seventh optical signal at f0.

A beneficial effect of this application is as follows. The tenth optical signal and the eleventh optical signal cancel the residual signal of the sixth optical signal at f0 and the residual signal of the seventh optical signal at f0 respectively. In this way, quality of an output signal can be improved.

Optionally, the first clock signal and the second clock signal are generated by a same clock source, or the first clock signal and the second clock signal are generated by two phase synchronized clock sources.

Optionally, the optical device further includes:

a first modulator, configured to modulate the twelfth optical signal:

a second modulator, configured to modulate the thirteenth optical signal; and a fourth optical coupler, configured to couple the modulated twelfth optical signal and the modulated thirteenth optical signal into a fourteenth optical signal, and output the fourteenth optical signal.

A beneficial effect of this application is as follows. The optical device may combine the sixth optical signal and the tenth optical signal, to output the twelfth optical signal with the frequency f0+f and cancel the residual signal of the sixth optical signal at f0, and combine the seventh optical signal and the eleventh optical signal, to output the thirteenth optical signal with the frequency f0−f and cancel the residual signal of the seventh optical signal at f0. The optical device is further configured to modulate the twelfth optical signal and the thirteenth optical signal, and couple the modulated twelfth optical signal and the modulated thirteenth optical signal into the fourteenth optical signal. In this way, quality of an output signal is improved.

Optionally, the at least three optical signals further include a fifteenth optical signal, and the optical device further includes:

a third modulator, configured to modulate the twelfth optical signal:

a fourth modulator, configured to modulate the thirteenth optical signal;

a fifth modulator, configured to modulate the fifteenth optical signal; and a fifth optical coupler, configured to couple the modulated twelfth optical signal, the modulated thirteenth optical signal, and the modulated fifteenth optical signal into a sixteenth optical signal, and output the sixteenth optical signal.

A beneficial effect of this application is as follows. The finally coupled sixteenth optical signal may be divided into three subcarriers. The three subcarriers are formed through modulation performed by the third modulator, the fourth modulator, and the fifth modulator respectively. Therefore, multicarrier modulation in any manner can be implemented, to implement flexible modulation.

Optionally, the optical device further includes:

a first ICR, configured to receive a first optical carrier, and perform coherent detection on the twelfth optical signal and the first optical carrier to obtain a first coherent detection signal;

a first analog-to-digital converter ADC, configured to perform analog-to-digital conversion on the first coherent detection signal to obtain a first digital signal;

a second ICR, configured to receive a second optical carrier, and perform coherent detection on the thirteenth optical signal and the second optical carrier to obtain a second coherent detection signal;

a second ADC, configured to perform analog-to-digital conversion on the second coherent detection signal to obtain a second digital signal; and a processor, configured to process the first digital signal and the second digital signal.

A beneficial effect of this application is as follows. The processor may separately process the first digital signal and the second digital signal, or may jointly process the first digital signal and the second digital signal, to achieve a beneficial effect of eliminating mutual crosstalk between some carriers.

Optionally, the at least three optical signals further include a seventeenth optical signal, and the optical device further includes:

a third ICR, configured to receive a third optical carrier, and perform coherent detection on the seventeenth optical signal and the third optical carrier to obtain a third coherent detection signal;

a third ADC, configured to perform analog-to-digital conversion on the third coherent detection signal to obtain a third digital signal; and the processor, further configured to process the third digital signal.

A beneficial effect of this application is as follows. The processor may separately process the first digital signal, the second digital signal, and the third digital signal, or may jointly process the first digital signal, the second digital signal, and the third digital signal, to achieve a beneficial effect of eliminating mutual crosstalk between some carriers.

The following provides an optical signal processing method, where the method may be performed by the foregoing optical device. Content and effects of the optical device are not described in detail again in the following.

According to a third aspect, this application provides an optical signal processing method, including: splitting a light source with a frequency f, to form at least three optical signals, where the at least three optical signals include a first optical signal, a second optical signal, and a third optical signal; driving the first optical signal based on a first clock signal $\cos(2\pi ft)$ to modulate the first optical signal, to obtain a fourth optical signal, where f represents a frequency of the first clock signal; driving the second optical signal based on a second clock signal $\sin(2\pi ft)$ to modulate the second optical signal, to obtain a fifth optical signal; coupling the fourth optical signal and the fifth optical signal to obtain a sixth optical signal and a seventh optical signal; performing power adjustment and phase shifting on the third optical signal to obtain an eighth optical signal; splitting the eighth optical signal into a ninth optical signal and a tenth optical signal; combining the sixth optical signal and the ninth optical signal, to obtain an eleventh optical signal with a frequency f0+f and cancel a residual signal of the sixth optical signal at f0; and combining the seventh optical signal and the tenth optical signal, to obtain a twelfth optical signal with a frequency f0−f and cancel a residual signal of the seventh optical signal at f0.

According to a fourth aspect, this application provides an optical signal method, including: splitting a light source with a frequency f0, to form at least three optical signals, where the at least three optical signals include a first optical signal, a second optical signal, and a third optical signal; driving the first optical signal based on a first clock signal $\cos(2\pi ft)$ to modulate the first optical signal, to obtain a fourth optical signal, where f represents a frequency of the first clock signal; driving the second optical signal based on a second clock signal $\sin(2\pi ft)$ to modulate the second optical signal, to obtain a fifth optical signal; coupling the fourth optical signal and the fifth optical signal to obtain a sixth optical signal and a seventh optical signal; splitting the third optical signal into an eighth optical signal and a ninth optical signal; performing power adjustment and phase shifting on the eighth optical signal to obtain a tenth optical signal; performing power adjustment and phase shifting on the ninth optical signal to obtain an eleventh optical signal; combining the sixth optical signal and the tenth optical signal, to obtain a twelfth optical signal with a frequency f0+f and cancel a residual signal of the sixth optical signal at f0; and combining the seventh optical signal and the eleventh optical signal, to obtain a thirteenth optical signal with a frequency f0−f and cancel a residual signal of the seventh optical signal at f0.

The optical device includes the first optical splitter, the first MZ modulator, the second MZ modulator, the first optical coupler, the power regulator, the phase shifter, the second optical splitter, the second optical coupler, and the third optical coupler. The first optical splitter is configured to split the light source with the frequency f, to form the at least three optical signals, where the at least three optical signals include the first optical signal, the second optical signal, and the third optical signal. The first MZ modulator is configured to drive the first optical signal based on the first clock signal $\cos(2\pi ft)$ to modulate the first optical signal, to output the fourth optical signal. The second MZ modulator is configured to drive the second optical signal based on the second clock signal $\sin(2\pi ft)$ to modulate the second optical signal, to output the fifth optical signal. The first optical coupler is configured to couple the fourth optical signal and the fifth optical signal to output the sixth optical signal and the seventh optical signal. The power regulator and the phase shifter are configured to respectively perform the power adjustment and the phase shifting on the third optical signal to output the eighth optical signal. The second optical splitter is configured to split the eighth optical signal into the ninth optical signal and the tenth optical signal. The second optical coupler is configured to combine the sixth optical signal and the ninth optical signal, to output the eleventh optical signal with the frequency f0+f and cancel the residual signal of the sixth optical signal at f0. The third optical coupler is configured to combine the seventh optical signal and the tenth optical signal, to output the twelfth optical signal with the frequency f0−f and cancel the residual signal of the seventh optical signal at f0. In this way, quality of an output signal is improved.

BRIEF DESCRIPTION OF DRAWINGS

FIG. 12A and FIG. 12B are a flowchart of an optical signal processing method according to another embodiment of this application;

FIG. 13A and FIG. 13B are a flowchart of an optical signal processing method according to still another embodiment of this application;

FIG. 14A and FIG. 14B are a flowchart of an optical signal processing method according to yet another embodiment of this application;

FIG. 17A and FIG. 17B are a flowchart of an optical signal processing method according to another embodiment of this application;

FIG. 18A and FIG. 18B are a flowchart of an optical signal processing method according to still another embodiment of this application;

FIG. 19A and FIG. 19B are a flowchart of an optical signal processing method according to yet another embodiment of this application; and FIG. 20A and FIG. 20B are a flowchart of an optical signal processing method according to still yet another embodiment of this application.

DESCRIPTION OF EMBODIMENTS

In the prior art, an optical frequency shifter is provided, including: one input port, a 1-input 2-output optical coupler connected to the one input port, two MZ modulators optically connected to two output ends of the 1-input 2-output optical coupler respectively, a 2-input 2-output optical coupler optically connected to output ends of the two MZ modulators, and two output optical ports connected to two output ends of the 2-input 2-output optical coupler. The optical frequency shifter uses a dual channel output technology. Because of problems such as an extinction ratio and bias control of the MZ modulator, carrier leakage may occur on both channels, and consequently quality of an output signal is not high.

To resolve the foregoing and/or other technical problem, this application provides an optical device and an optical signal processing method.

Embodiment 1

Figure 1:
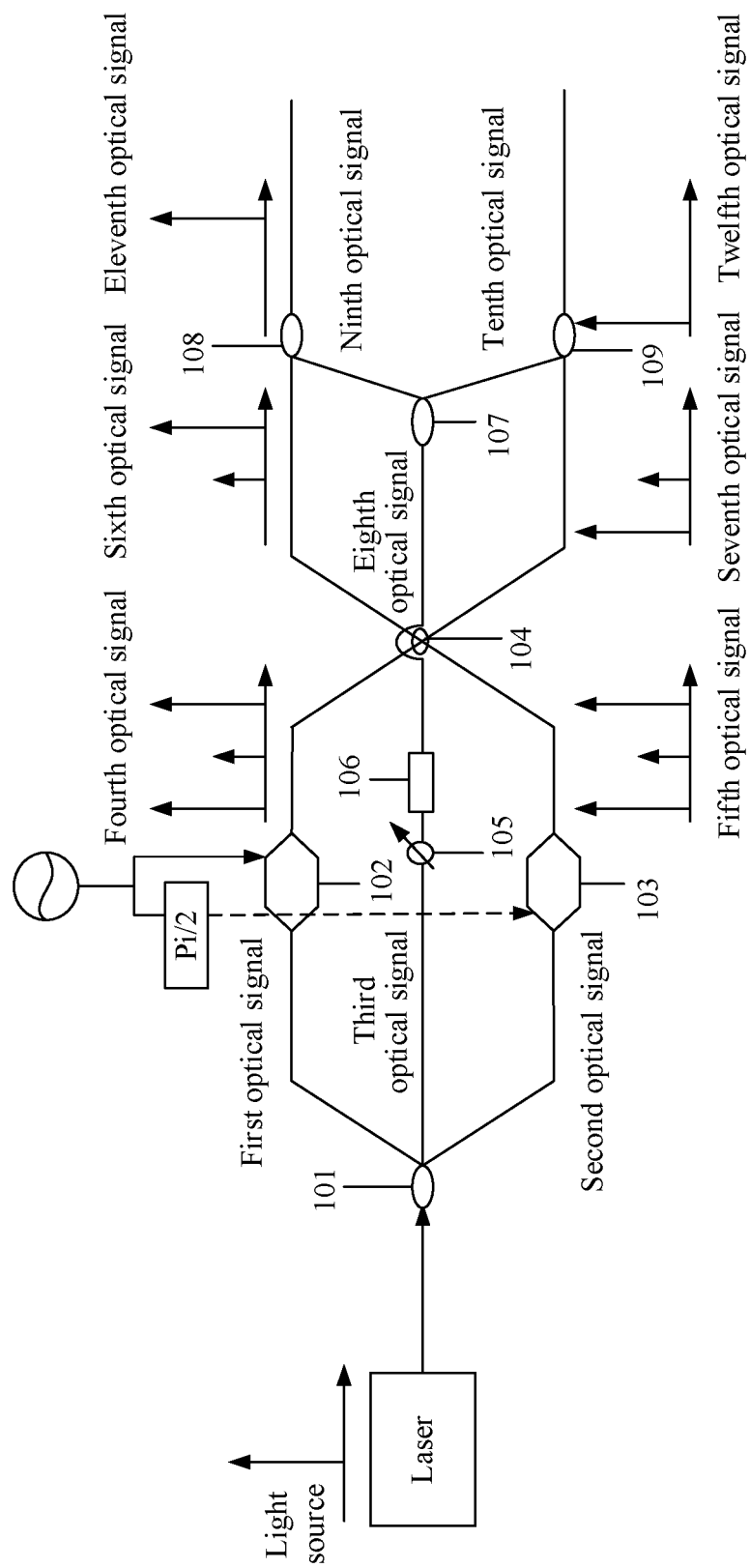
FIG. 1 is a schematic structural diagram of an optical device according to Embodiment 1 of this application.

FIG. 1 is a schematic structural diagram of an optical device according to Embodiment 1 of this application. The optical device may be a multicarrier generator, a modulator, a transmitter, a receiver, or the like. This is not limited in this application. The optical device includes a first optical splitter 101, a first MZ modulator 102, a second MZ modulator 103, a first optical coupler 104, a power regulator 105, a phase shifter 106, a second optical splitter 107, a second optical coupler 108, and a third optical coupler 109. All these components each have at least one input end and at least one output end.

An input end of the first optical splitter 101 is configured to obtain a light source generated by a laser. A plurality of output ends of the first optical splitter 101 are connected to an input end of the first MZ modulator 102, an input end of the second MZ modulator 103, and an input end of the power regulator 105 respectively. An output end of the power regulator 105 is connected to an input end of the phase shifter 106. An output end of the first MZ modulator 102 and an output end of the second MZ modulator 103 are connected to input ends of the first optical coupler 104 respectively. Two output ends of the first optical coupler 104 are connected to an input end of the second optical coupler 108 and an input end of the third optical coupler 109 respectively. An output end of the phase shifter 106 is connected to an input end of the second optical splitter 107. Two output ends of the second optical splitter 107 are connected to an input end of the second optical coupler 108 and an input end of the third optical coupler 109 respectively.

Specifically, the first optical splitter 101 is configured to split the light source with a frequency f0, to form at least three optical signals, where the at least three optical signals include a first optical signal, a second optical signal, and a third optical signal. The first optical splitter 101 may be an optical coupler, an optical splitter, or the like. This is not limited in this application. The at least three optical signals formed by the first optical splitter 101 are all optical signals with a frequency f0.

The first MZ modulator 102 is configured to drive the first optical signal based on a first clock signal $\cos(2\pi ft)$ to modulate the first optical signal, to output a fourth optical signal, where f represents a frequency of the first clock signal. The second MZ modulator 103 is configured to drive the second optical signal based on a second clock signal $\sin(2\pi ft)$ to modulate the second optical signal, to output a fifth optical signal. The frequency of the first clock signal and a frequency of the second clock signal are both f.

As described above, the first optical signal and the second optical signal enter the first MZ modulator 102 and the second MZ modulator 103 respectively. The first clock signal $\cos(2\pi ft)$ is used to drive the first optical signal to modulate the first optical signal, to output the fourth optical signal. f represents the frequency of the first clock signal, and t represents a time. As shown in FIG. 1, the fourth optical signal output from the first MZ modulator 102 has a spectral composition mainly including three frequency lines. A frequency line in the middle represents a residual signal of the fourth optical signal at f0, and frequency lines on both sides represent valid signals of the fourth optical signal. Frequencies of the frequency lines on both sides are f0−f and f0+f. The residual signal of the fourth optical signal at f0 refers to a carrier leaked at f0 in the fourth optical signal, excluding the valid signals. In a generalized definition, a residual signal of an optical signal refers to a leaked carrier in the optical signal, excluding a valid signal, and the residual signal is also referred to as an invalid signal. In other words, the first optical signal of one wavelength is modulated by the first MZ modulator, so that the fourth optical signal is obtained. The fourth optical signal includes optical signals of two wavelengths and the residual signal at f0, where a frequency spacing between the optical signals of two wavelengths is 2f.

The second clock signal $\sin(2\pi ft)$ is used to drive the second optical signal to modulate the second optical signal, to output the fifth optical signal. f represents the frequency of the second clock signal, and t represents a time. The frequency of the first clock signal and the frequency of the second clock signal are the same, and are both f. As shown in FIG. 1, the fifth optical signal output from the second MZ modulator 103 has a spectral composition mainly including three frequency lines. A frequency line in the middle represents a residual signal of the fifth optical signal at f0, and frequency lines on both sides represent valid signals of the fifth optical signal. Frequencies of the frequency lines on both sides are f0−f and f0+f. In other words, the second optical signal of one wavelength is modulated by the second MZ modulator, so that the fifth optical signal is obtained. The fifth optical signal includes optical signals of two wavelengths and the residual signal at f0, where a frequency spacing between the optical signals of two wavelengths is 2f.

Optionally, the first clock signal and the second clock signal are generated by two phase synchronized clock sources. Alternatively, the first clock signal and the second clock signal are generated by a same clock source. For example, as shown in FIG. 1, the first clock signal and the second clock signal are generated by a same clock source, and the second clock signal may be obtained by driving the clock source of the first clock signal to shift a phase of the first clock signal by ¼ cycle.

The first optical coupler 104 is configured to couple the fourth optical signal and the fifth optical signal to output a sixth optical signal and a seventh optical signal. The first optical coupler 104 may be a 2-input 2-output optical coupler, that is, a 2×2 coupler. A Jones matrix of the 2×2 coupler is $$\begin{bmatrix} 1 & j \\ j & 1 \end{bmatrix}.$$

The 2×2 coupler couples the fourth optical signal and the fifth optical signal based on the Jones matrix, to output the sixth optical signal and the seventh optical signal. The sixth optical signal includes a valid signal $\cos(2\pi ft)+j\cdot\sin(2\pi ft)=e^{j2\pi ft}$ and a residual signal of the sixth optical signal at f0. As shown in FIG. 1, the sixth optical signal has a spectral composition mainly including two frequency lines. A frequency line on the left represents the residual signal of the sixth optical signal at f0. A frequency line on the right represents the valid signal $\cos(2\pi ft)+j\cdot\sin(2\pi ft)=j\cdot e^{-j2\pi ft}$ of the sixth optical signal. A frequency of the valid signal of the sixth optical signal is f0+f. Correspondingly, the seventh optical signal includes a valid signal $\cos(2\pi ft)-j\cdot\sin(2\pi ft)=j\cdot e^{-j2\pi ft}$ and a residual signal of the seventh optical signal at f0. As shown in FIG. 1, the seventh optical signal has a spectral composition mainly including two frequency lines. A frequency line on the left represents the valid signal $\cos(2\pi ft)-j\cdot\sin(2\pi ft)=j\cdot e^{-j2\pi ft}$ of the seventh optical signal. A frequency of the valid signal of the seventh optical signal is f0−f. A frequency line on the right represents the residual signal of the seventh optical signal at fn.

As described above, because of problems such as an extinction ratio and bias control of the MZ modulator, and that powers of branches of the 2×2 coupler cannot be completely consistent, the sixth optical signal and the seventh optical signal both have the residual signal at f0. To eliminate the residual signal of the sixth optical signal at f0 and the residual signal of the seventh optical signal at f0, this application introduces the third optical signal.

Specifically, the power regulator 105 and the phase shifter 106 are configured to respectively perform power adjustment and phase shifting on the third optical signal to output an eighth optical signal. The second optical splitter 107 is configured to split the eighth optical signal into a ninth optical signal and a tenth optical signal. The second optical coupler 108 is configured to combine the sixth optical signal and the ninth optical signal, to output an eleventh optical signal with a frequency f0+f and cancel the residual signal of the sixth optical signal at f0. The third optical coupler 109 is configured to combine the seventh optical signal and the tenth optical signal, to output a twelfth optical signal with a frequency f0−f and cancel the residual signal of the seventh optical signal at f0.

The power regulator 105 may be an attenuator. The second optical splitter 107 may be a 1-input 2-output coupler, that is, a 1×2 coupler. The 1×2 coupler may split the eighth optical signal into the ninth optical signal and the tenth optical signal. A residual signal of the obtained ninth optical signal at f0 and the residual signal of the sixth optical signal at f0 are the same in power and opposite in phase. Similarly, a residual signal of the obtained tenth optical signal at f0 and the residual signal of the seventh optical signal at f0 are the same in power and opposite in phase. Specifically, the second optical coupler 108 is configured to combine the sixth optical signal and the ninth optical signal, to output the eleventh optical signal with the frequency f0+f and cancel the residual signal of the sixth optical signal at f0. As shown in FIG. 1, the eleventh optical signal has a spectral composition mainly including one frequency line. A frequency of the frequency line is f. Similarly, the third optical coupler 109 is configured to combine the seventh optical signal and the tenth optical signal, to output the twelfth optical signal with the frequency f0−f and cancel the residual signal of the seventh optical signal at f0. As shown in FIG. 1, the twelfth optical signal has a spectral composition mainly including one frequency line. A frequency of the frequency line is −f.

Aspects of this application provide the optical device, including the first optical splitter, the first MZ modulator, the second MZ modulator, the first optical coupler, the power regulator, the phase shifter, the second optical splitter, the second optical coupler, and the third optical coupler. The first optical splitter is configured to split the light source with the frequency f, to form the at least three optical signals, where the at least three optical signals include the first optical signal, the second optical signal, and the third optical signal. The first MZ modulator is configured to drive the first optical signal based on the first clock signal $\cos(2\pi ft)$ to modulate the first optical signal, to output the fourth optical signal. The second MZ modulator is configured to drive the second optical signal based on the second clock signal $\sin(2\pi ft)$ to modulate the second optical signal, to output the fifth optical signal. The first optical coupler is configured to couple the fourth optical signal and the fifth optical signal to output the sixth optical signal and the seventh optical signal. The power regulator and the phase shifter are configured to respectively perform the power adjustment and the phase shifting on the third optical signal to output the eighth optical signal. The second optical splitter is configured to split the eighth optical signal into the ninth optical signal and the tenth optical signal. The second optical coupler is configured to combine the sixth optical signal and the ninth optical signal, to output the eleventh optical signal with the frequency f0+f and cancel the residual signal of the sixth optical signal at f0. The third optical coupler is configured to combine the seventh optical signal and the tenth optical signal, to output the twelfth optical signal with the frequency f0−f and cancel the residual signal of the seventh optical signal at f0. In this way, quality of an output signal is improved.

Embodiment 2

Figure 2:
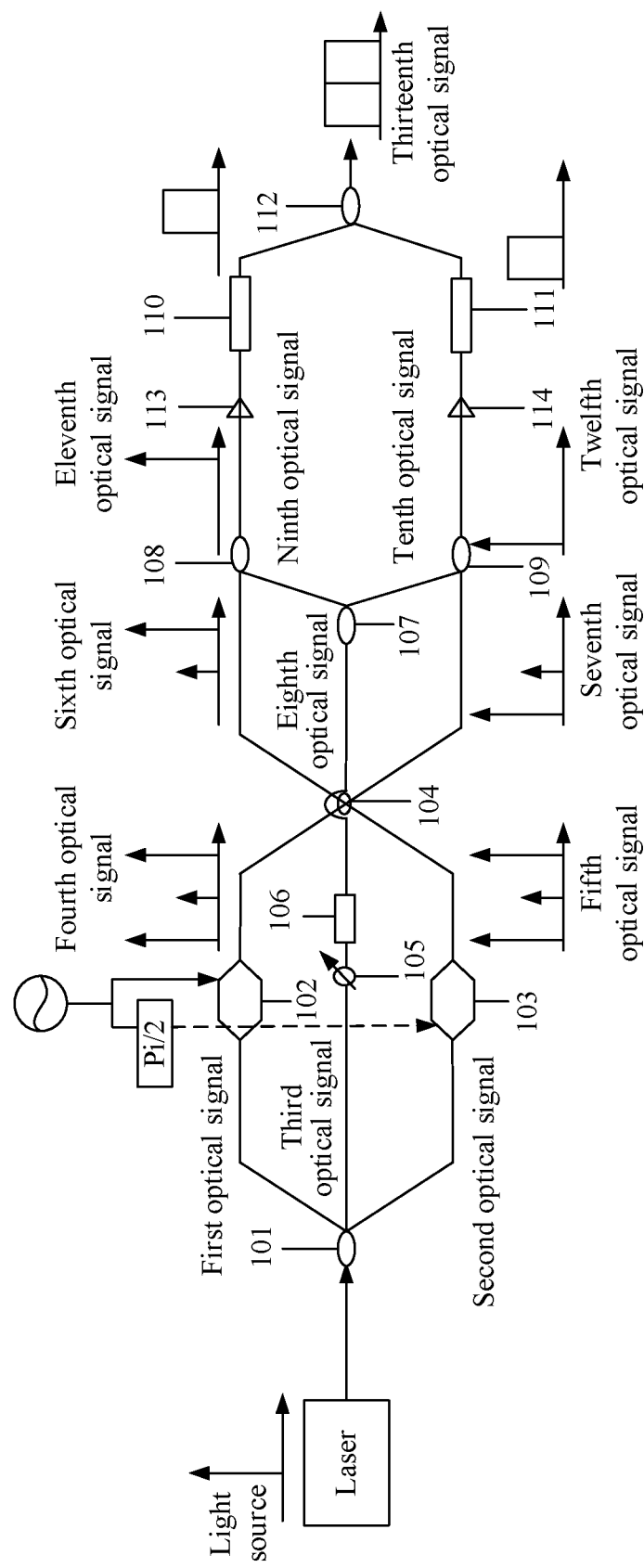
FIG. 2 is a schematic structural diagram of an optical device according to Embodiment 2 of this application.

Based on Embodiment 1, further, the optical device may be a multicarrier generator, a modulator, or a transmitter. Specifically, FIG. 2 is a schematic structural diagram of an optical device according to Embodiment 2 of this application. The optical device further includes a first modulator 110, a second modulator 111, and a fourth optical coupler 112. Optionally, the optical device further includes a first amplifier 113 and a second amplifier 114. All the components included in the optical device each have at least one input end and at least one output end. An output end of the second optical coupler 108 is connected to an input end of the first amplifier 113, and an output end of the first amplifier 113 is connected to an input end of the first modulator 110. An output end of the third optical coupler 109 is connected to an input end of the second amplifier 114, and an output end of the second amplifier 114 is connected to an input end of the second modulator 111. An output end of the first modulator 110 and an output end of the second modulator 111 are connected to input ends of the fourth optical coupler 112.

Optionally, the first modulator 110 and the second modulator 111 may both be dual-polarization in-phase/quadrature modulators (Dual-Polarization In-phase Quadrature Modulator, DP-IQMZ). The fourth optical coupler 112 may be a 1-input 2-output coupler, that is, a 1×2 coupler.

When the optical device does not include the first amplifier 113 and the second amplifier 114, the first modulator 110 is configured to modulate the eleventh optical signal, and the second modulator 111 is configured to modulate the twelfth optical signal. The fourth optical coupler 112 is configured to couple the modulated eleventh optical signal and the modulated twelfth optical signal into a thirteenth optical signal, and output the thirteenth optical signal. When the optical device includes the first amplifier 113 and the second amplifier 114, the first modulator 110 is configured to modulate the eleventh optical signal amplified by the first amplifier 113, and the second modulator 111 is configured to modulate the twelfth optical signal amplified by the second amplifier 114. The fourth optical coupler 112 is configured to couple the modulated eleventh optical signal and the modulated twelfth optical signal into a thirteenth optical signal, and output the thirteenth optical signal. As shown in FIG. 2, it can be learned from a frequency spectrum that the thirteenth optical signal includes an upper sideband and a lower sideband (that is, the modulated eleventh optical signal and the modulated twelfth optical signal).

The optical device may combine the sixth optical signal and the ninth optical signal, to output the eleventh optical signal with the frequency f0+f and cancel the residual signal of the sixth optical signal at f0, and combine the seventh optical signal and the tenth optical signal, to output the twelfth optical signal with the frequency f0−f and cancel the residual signal of the seventh optical signal at f0. The optical device is further configured to modulate the eleventh optical signal and the twelfth optical signal, and couple the modulated eleventh optical signal and the modulated twelfth optical signal into the thirteenth optical signal. In this way, quality of an output signal is improved.

Embodiment 3

Figure 3:
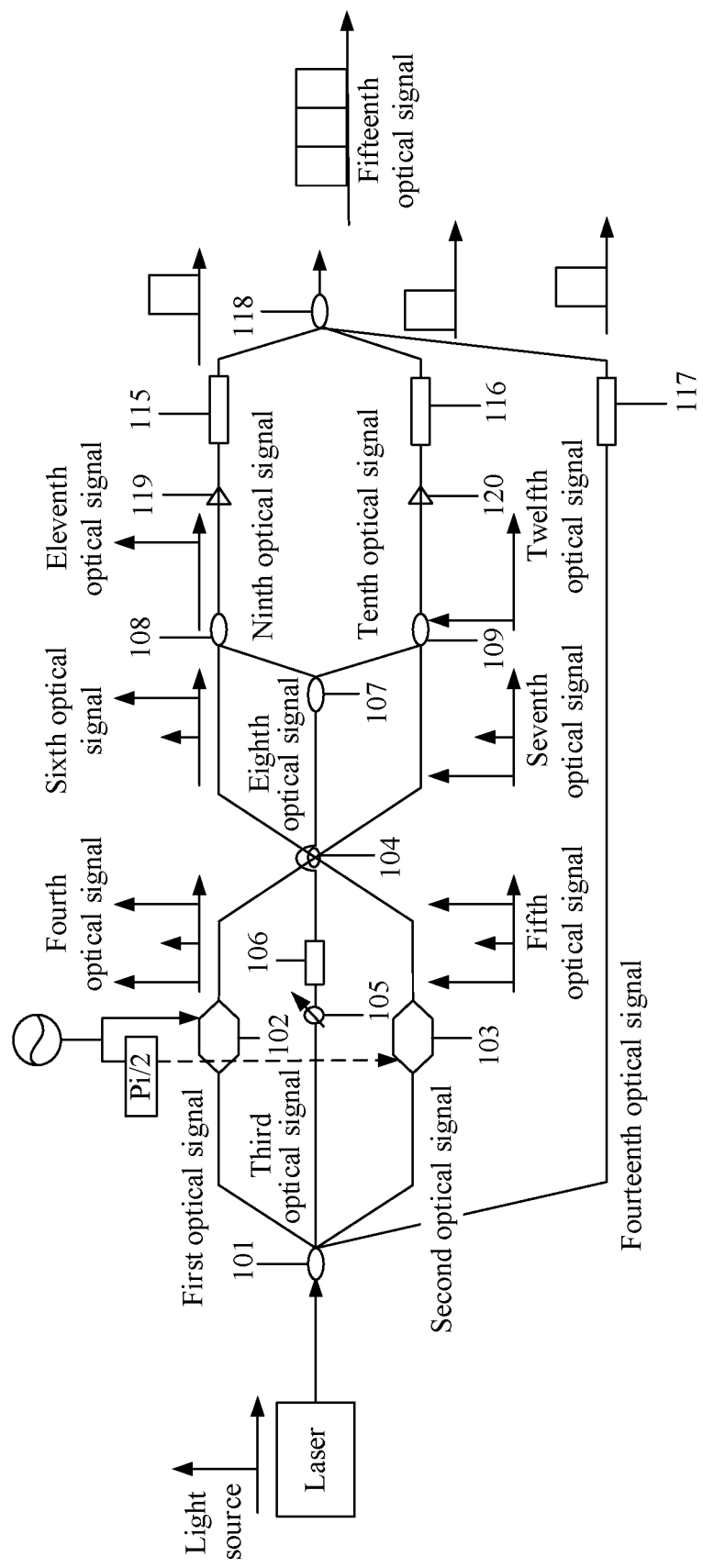
FIG. 3 is a schematic structural diagram of an optical device according to Embodiment 3 of this application.

Based on Embodiment 1, the optical device may be a multicarrier generator, a modulator, or a transmitter. Specifically, FIG. 3 is a schematic structural diagram of an optical device according to Embodiment 3 of this application. The at least three optical signals formed by the first optical splitter 101 further include a fourteenth optical signal. Based on this, the optical device further includes a third modulator 115, a fourth modulator 116, a fifth modulator 117, and a fifth optical coupler 118. Optionally, the optical device further includes a third amplifier 119 and a fourth amplifier 120. All the components included in the optical device each have at least one input end and at least one output end. An output end of the second optical coupler 108 is connected to an input end of the third amplifier 119, and an output end of the third amplifier 119 is connected to an input end of the third modulator 115. An output end of the third optical coupler 109 is connected to an input end of the fourth amplifier 120, and an output end of the fourth amplifier 120 is connected to an input end of the fourth modulator 116. An output end of the first optical splitter 101 is connected to an input end of the fifth modulator 117. An output end of the third modulator 115, an output end of the fourth modulator 116, and an output end of the fifth modulator 117 are connected to input ends of the fifth optical coupler 118 respectively.

When the optical device does not include the third amplifier 119 and the fourth amplifier 120, the third modulator 115 is configured to modulate the eleventh optical signal, the fourth modulator 116 is configured to modulate the twelfth optical signal, and the fifth modulator 117 is configured to modulate the fourteenth optical signal. The fifth optical coupler 118 is configured to couple the modulated eleventh optical signal, the modulated twelfth optical signal, and the modulated fourteenth optical signal into a fifteenth optical signal, and output the fifteenth optical signal. When the optical device includes the third amplifier 119 and the fourth amplifier 120, the third modulator 115 is configured to modulate the eleventh optical signal amplified by the third amplifier 119, the fourth modulator 116 is configured to modulate the twelfth optical signal amplified by the fourth amplifier 120, and the fifth modulator 117 is configured to modulate the fourteenth optical signal. The fifth optical coupler 118 is configured to couple the modulated eleventh optical signal, the modulated twelfth optical signal, and the modulated fourteenth optical signal into a fifteenth optical signal, and output the fifteenth optical signal. As shown in FIG. 3, it can be seen from a frequency spectrum that the finally coupled fifteenth optical signal may be divided into three subcarriers. The three subcarriers are formed through modulation performed by the third modulator 115, the fourth modulator 116, and the fifth modulator 117 respectively. Therefore, multicarrier modulation in any manner can be implemented. As shown in FIG. 3, the three subcarriers may be arranged orthogonally, overlapped non-orthogonally, or modulated into subcarriers with different rates, to implement flexible modulation.

The optical device may combine the sixth optical signal and the ninth optical signal, to output the eleventh optical signal with the frequency f0+f and cancel the residual signal of the sixth optical signal at f0, and combine the seventh optical signal and the tenth optical signal, to output the twelfth optical signal with the frequency f0−f and cancel the residual signal of the seventh optical signal at f0. The optical device is further configured to modulate the eleventh optical signal and the twelfth optical signal, and couple the modulated eleventh optical signal, the modulated twelfth optical signal, and the modulated fourteenth optical signal into the fifteenth optical signal. In this way, quality of an output signal is improved. Further, the finally coupled fifteenth optical signal may be divided into the three subcarriers. The three subcarriers are formed through the modulation performed by the third modulator, the fourth modulator, and the fifth modulator. Therefore, multicarrier modulation in any manner can be implemented, to implement flexible modulation.

Embodiment 4

Figure 4:
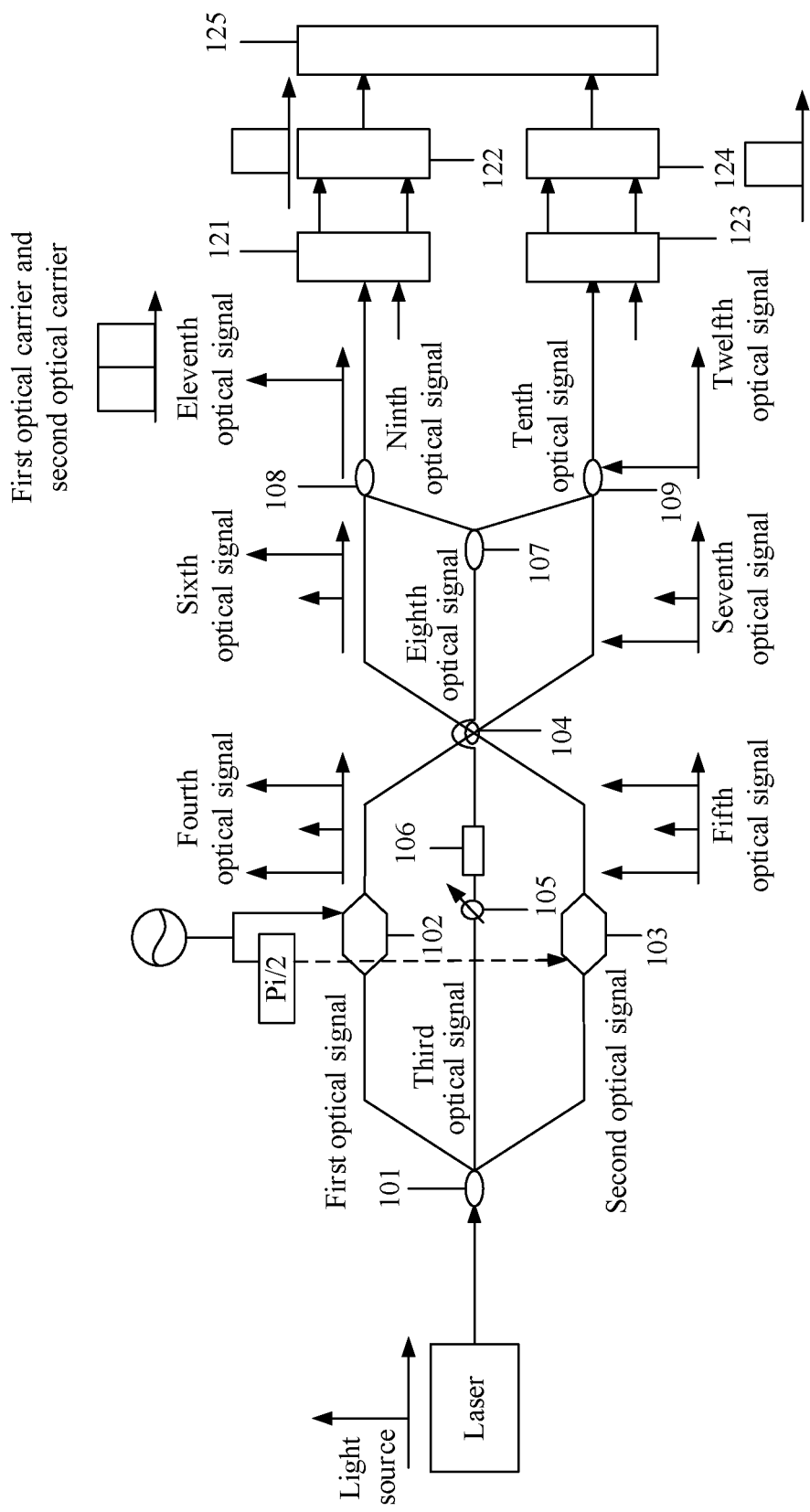
FIG. 4 is a schematic structural diagram of an optical device according to Embodiment 4 of this application.

Based on Embodiment 1, the optical device may be a multicarrier generator, a modulator, or a receiver. Specifically, FIG. 4 is a schematic structural diagram of an optical device according to Embodiment 4 of this application. As shown in FIG. 4, the optical device further includes a first integrated coherent receiver (ICR) 121, a first analog-to-digital converter (ADC) 122, a second ICR 123, a second ADC 124, and a processor 125. All the components included in the optical device each have at least one input end and at least one output end. An output end of the second optical coupler 108 is connected to an input end of the first ICR 121, an output end of the first ICR 121 is connected to an input end of the first ADC 122, and an output end of the first ADC 122 is connected to the processor 125. An output end of the third optical coupler 109 is connected to an input end of the second ICR 123, an output end of the second ICR 123 is connected to an input end of the second ADC 124, and an output end of the second ADC 124 is connected to the processor 125.

Specifically, the first ICR 121 is configured to receive a first optical carrier, and perform coherent detection on the eleventh optical signal and the first optical carrier to obtain a first coherent detection signal. The coherent detection method in this application is based on the prior art, and details are not described in this application. The first ADC 122 is configured to perform analog-to-digital conversion on the first coherent detection signal to obtain a first digital signal. The second ICR 123 is configured to receive a second optical carrier, and perform coherent detection on the twelfth optical signal and the second optical carrier to obtain a second coherent detection signal. The second ADC 124 is configured to perform analog-to-digital conversion on the second coherent detection signal to obtain a second digital signal. The processor 125 is configured to process the first digital signal and the second digital signal. The processor 125 may be a digital signal processor (Digital Signal Processing, DSP), a central processing unit (CPU), a microcontroller unit (MCU), or the like. This is not limited in this application.

Aspects of this application provide the optical device, where the output eleventh optical signal and the output twelfth optical signal may be used as local oscillator light sources of the first ICR and the second ICR respectively. The first ICR and the second ICR receive the two carriers, perform the coherent detection on the corresponding carriers and the local oscillator light sources, and output the coherent detection signals to the first ADC and the second ADC respectively. The first ADC and the second ADC perform the analog-to-digital conversion on the corresponding coherent detection signals to obtain the first digital signal and the second digital signal respectively. The processor may separately process the first digital signal and the second digital signal, or may jointly process the first digital signal and the second digital signal, to achieve a beneficial effect of eliminating mutual crosstalk between two carriers with a frequency f0−f and a frequency f0+f.

Embodiment 5

Figure 5:
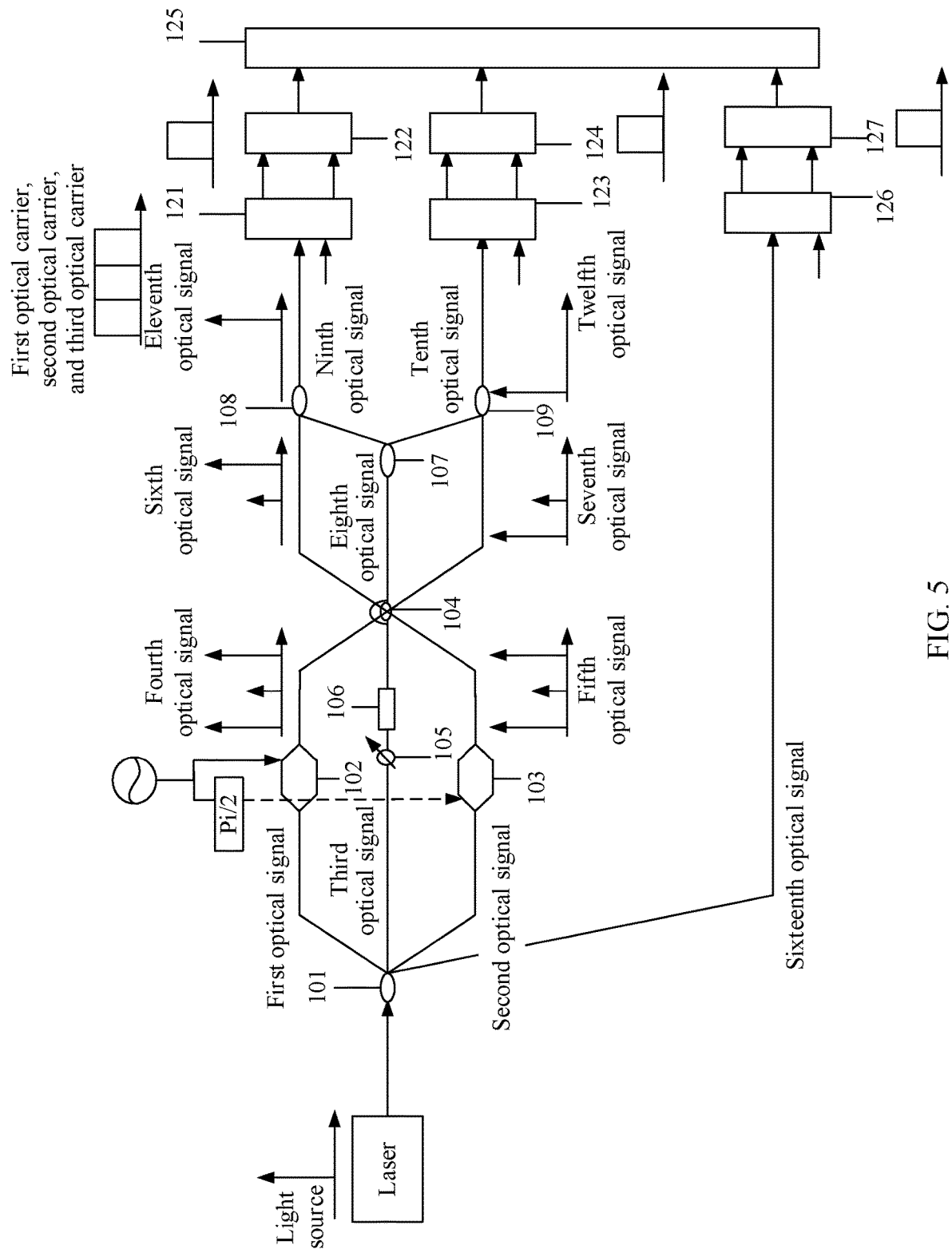
FIG. 5 is a schematic structural diagram of an optical device according to Embodiment 5 of this application.

Based on Embodiment 4, the at least three optical signals formed by the first optical splitter 101 further include a sixteenth optical signal. Based on this, the optical device further includes a third ICR and a third ADC. All the components included in the optical device each have at least one input end and at least one output end. Specifically, FIG. 5 is a schematic structural diagram of an optical device according to Embodiment 5 of this application. As shown in FIG. 5, an output end of the optical splitter 101 is connected to an input end of the third ICR 126, an output end of the third ICR 126 is connected to an input end of the third ADC 127, and an output end of the third ADC 127 is connected to the processor 125.

Specifically, the third ICR 126 is configured to receive a third optical carrier, and perform coherent detection on the sixteenth optical signal and the third optical carrier to obtain a third coherent detection signal. The third ADC 127 is configured to perform analog-to-digital conversion on the third coherent detection signal to obtain a third digital signal. The processor 125 is further configured to process the third digital signal. The processor may separately process the first digital signal, the second digital signal, and the third digital signal, or may jointly process the first digital signal, the second digital signal, and the third digital signal.

This application provides the optical device, where the output eleventh optical signal, the output twelfth optical signal, and the output sixteenth optical signal may be used as local oscillator light sources of the first ICR the second ICR and the third ICR respectively. The first ICR, the second ICR, and the third ICR receive the three carriers, perform the coherent detection on the corresponding carriers and the local oscillator light sources, and output the coherent detection signals to the first ADC, the second ADC, and the third ADC respectively. The first ADC, the second ADC, and the third ADC perform the analog-to-digital conversion on the corresponding coherent detection signals to obtain the first digital signal, the second digital signal, and the third digital signal respectively. The processor may separately process the first digital signal, the second digital signal, and the third digital signal, or may jointly process the first digital signal, the second digital signal, and the third digital signal, to achieve a beneficial effect of eliminating mutual crosstalk between some carriers.

Embodiment 6

Figure 6:
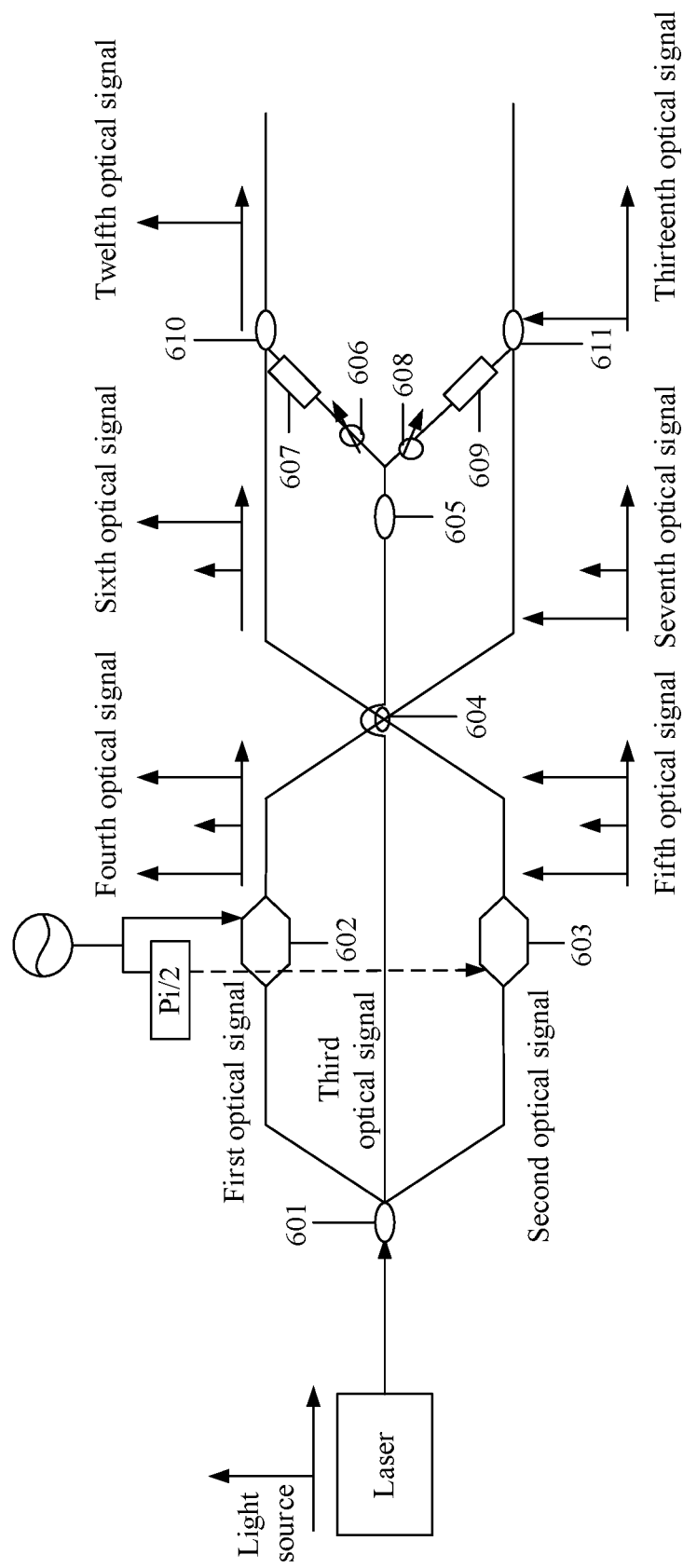
FIG. 6 is a schematic structural diagram of an optical device according to Embodiment 6 of this application.

FIG. 6 is a schematic structural diagram of an optical device according to Embodiment 6 of this application. The optical device may be a multicarrier generator, a modulator, a transmitter, a receiver, or the like. This is not limited in this application. The optical device includes a first optical splitter 601, a first MZ modulator 602, a second MZ modulator 603, a first optical coupler 604, a second optical splitter 605, a first power regulator 606, a first phase shifter 607, a second power regulator 608, a second phase shifter 609, a second optical coupler 610, and a third optical coupler 611. All these components each have at least one input end and at least one output end.

An input end of the first optical splitter 601 is configured to obtain a light source generated by a laser. A plurality of output ends of the first optical splitter 601 are connected to an input end of the first MZ modulator 602, an input end of the second MZ modulator 603, and an input end of the second optical splitter 605. An output end of the first MZ modulator 602 and an output end of the second MZ modulator 603 are connected to input ends of the first optical coupler 604. Two output ends of the first optical coupler 604 are connected to an input end of the second optical coupler 610 and an input end of the third optical coupler 611 respectively. Two output ends of the second optical splitter 605 are connected to an input end of the first power regulator 606 and an input end of the second power regulator 608 respectively. An output end of the first power regulator 606 is connected to an input end of the first phase shifter 607, and an output end of the first phase shifter 607 is connected to an input end of the second optical coupler 610. An output end of the second power regulator 608 is connected to an input end of the second phase shifter 609, and an output end of the second phase shifter 609 is connected to an input end of the third optical coupler 611.

Specifically, the first optical splitter 601 is configured to split the light source with a frequency f0, to form at least three optical signals, where the at least three optical signals include a first optical signal, a second optical signal, and a third optical signal. The first optical splitter 601 may be an optical coupler, an optical splitter, or the like. This is not limited in this application. The at least three optical signals formed by the first optical splitter 101 are all optical signals with a frequency f0.

The first MZ modulator 602 is configured to drive the first optical signal based on a first clock signal $\cos(2\pi ft)$ to modulate the first optical signal, to output a fourth optical signal, where f represents a frequency of the first clock signal. The second MZ modulator 603 is configured to drive the second optical signal based on a second clock signal $\sin(2\pi ft)$ to modulate the second optical signal, to output a fifth optical signal. The frequency of the first clock signal and a frequency of the second clock signal are both f.

As described above, the first optical signal and the second optical signal enter the first MZ modulator 602 and the second MZ modulator 603 respectively. The first clock signal $\cos(2\pi ft)$ is used to drive the first optical signal to modulate the first optical signal, to output the fourth optical signal. f represents the frequency of the first clock signal, and t represents a time. As shown in FIG. 6, the fourth optical signal output from the first MZ modulator 602 has a spectral composition mainly including three frequency lines. A frequency line in the middle represents a residual signal of the fourth optical signal at f0, and frequency lines on both sides represent valid signals of the fourth optical signal. Frequencies of the frequency lines on both sides are f0−f and f0+f. In other words, the first optical signal of one wavelength is modulated by the first MZ modulator, so that the fourth optical signal is obtained. The fourth optical signal includes optical signals of two wavelengths and the residual signal at f0, where a frequency spacing between the optical signals of two wavelengths is 2f.

The second clock signal $\sin(2\pi ft)$ is used to drive the second optical signal to modulate the second optical signal, to output the fifth optical signal. f represents the frequency of the second clock signal, and t represents a time. The frequency of the first clock signal and the frequency of the second clock signal are the same, and are both f. As shown in FIG. 6, the fifth optical signal output from the second MZ modulator 603 has a spectral composition mainly including three frequency lines. A frequency line in the middle represents a residual signal of the fifth optical signal at f), and frequency lines on both sides represent valid signals of the fifth optical signal. Frequencies of the frequency lines on both sides are f0−f and f0+f respectively. In other words, the second optical signal of one wavelength is modulated by the second MZ modulator, so that the fifth optical signal is obtained. The fifth optical signal includes optical signals of two wavelengths and the residual signal at f0, where a frequency spacing between the optical signals of two wavelengths is 2f.

Optionally, the first clock signal and the second clock signal are generated by two phase synchronized clock sources. Alternatively, the first clock signal and the second clock signal are generated by a same clock source. For example, as shown in FIG. 6, the first clock signal and the second clock signal are generated by a same clock source, and the second clock signal may be obtained by driving the clock source of the first clock signal to shift a phase of the first clock signal by ¼ cycle. Alternatively, the first clock signal and the second clock signal are generated by the same clock source.

The first optical coupler 604 is configured to couple the fourth optical signal and the fifth optical signal to output a sixth optical signal and a seventh optical signal. The first optical coupler 604 may be a 2-input 2-output optical coupler, that is, a 2×2 coupler. A Jones matrix of the 2×2 coupler is $$\begin{bmatrix} 1 & j \\ j & 1 \end{bmatrix}.$$

The 2×2 coupler couples the fourth optical signal and the fifth optical signal based on the Jones matrix, to output the sixth optical signal and the seventh optical signal. The sixth optical signal includes a valid signal $\cos(2\pi ft)+j\cdot\sin(2\pi ft)=e^{j2\pi ft}$ and a residual signal of the sixth optical signal at f0. As shown in FIG. 6, the sixth optical signal has a spectral composition mainly including two frequency lines. A frequency line on the left represents the residual signal of the sixth optical signal at f1. A frequency line on the right represents the valid signal $\cos(2\pi ft)+j\cdot\sin(2\pi ft)=e^{j2\pi ft}$ of the sixth optical signal. A frequency of the valid signal of the sixth optical signal is f0+f. Correspondingly, the seventh optical signal includes a valid signal $\cos(2\pi ft)-j\cdot\sin(2\pi ft)=j\cdot e^{-j2\pi ft}$ and a residual signal of the seventh optical signal at f0. As shown in FIG. 6, the seventh optical signal has a spectral composition mainly including two frequency lines. A frequency line on the left represents the valid signal $\cos(2\pi ft)-j\cdot\sin(2\pi ft)=j\cdot e^{-j2\pi ft}$ of the seventh optical signal. A frequency of the valid signal of the seventh optical signal is f0−f. A frequency line on the right represents the residual signal of the seventh optical signal at f0.

As described above, because of problems such as an extinction ratio and bias control of the MZ modulator, and that powers of branches of the 2×2 coupler cannot be completely consistent, the sixth optical signal and the seventh optical signal both have the residual signal at f0. To eliminate the residual signal of the sixth optical signal at f0 and the residual signal of the seventh optical signal at f0, this application introduces the third optical signal.

Specifically, the second optical splitter 605 is configured to split the third optical signal into an eighth optical signal and a ninth optical signal. The first power regulator 606 and the first phase shifter 607 are configured to respectively perform power adjustment and phase shifting on the eighth optical signal to output a tenth optical signal. The second power regulator 608 and the second phase shifter 609 are configured to respectively perform power adjustment and phase shifting on the ninth optical signal to output an eleventh optical signal.

The second optical coupler 610 is configured to combine the sixth optical signal and the tenth optical signal, to output a twelfth optical signal with a frequency f0+f and cancel the residual signal of the sixth optical signal at f0. The third optical coupler 611 is configured to combine the seventh optical signal and the eleventh optical signal, to output a thirteenth optical signal with a frequency f0−f and cancel the residual signal of the seventh optical signal at f0.

The first power regulator 606 and the second power regulator 608 may both be attenuators. The second optical splitter 605 may be a 1-input 2-output coupler, that is, a 1×2 coupler. The 1×2 coupler may split the third optical signal into the eighth optical signal and the ninth optical signal. The first power regulator 606 and the first phase shifter 607 are configured to respectively perform the power adjustment and the phase shifting on the eighth optical signal to output the tenth optical signal. The second power regulator 608 and the second phase shifter 609 are configured to respectively perform the power adjustment and the phase shifting on the ninth optical signal to output the eleventh optical signal. A residual signal of the obtained tenth optical signal at f0 and the residual signal of the sixth optical signal at f0 are the same in power and opposite in phase. Similarly, a residual signal of the obtained eleventh optical signal at f0 and the residual signal of the seventh optical signal at f0 are the same in power and opposite in phase. Specifically, the second optical coupler 610 is configured to combine the sixth optical signal and the tenth optical signal, to output the twelfth optical signal with the frequency f0+f and cancel the residual signal of the sixth optical signal at f0. As shown in FIG. 6, the twelfth optical signal has a spectral composition mainly including one frequency line. A frequency of the frequency line is f. Similarly, the third optical coupler 611 is configured to combine the seventh optical signal and the eleventh optical signal, to output the thirteenth optical signal with the frequency f0−f and cancel the residual signal of the seventh optical signal at f0. As shown in FIG. 6, the thirteenth optical signal has a spectral composition mainly including one frequency line. A frequency of the frequency line is −f.

This application provides the optical device, including the first optical splitter, the first MZ modulator, the second MZ modulator, the first optical coupler, the second optical splitter, the first power regulator, the first phase shifter, the second power regulator, the second phase shifter, the second optical coupler, and the third optical coupler. The first optical splitter is configured to split the light source with the frequency f0, to form the at least three optical signals, where the at least three optical signals include the first optical signal, the second optical signal, and the third optical signal. The first MZ modulator is configured to drive the first optical signal based on the first clock signal cos(2 π ft) to modulate the first optical signal, to output the fourth optical signal. The second MZ modulator is configured to drive the second optical signal based on the second clock signal sin(2π ft) to modulate the second optical signal, to output the fifth optical signal. The first optical coupler is configured to couple the fourth optical signal and the fifth optical signal to output the sixth optical signal and the seventh optical signal. The second optical splitter is configured to split the third optical signal into the eighth optical signal and the ninth optical signal. The first power regulator and the first phase shifter are configured to respectively perform the power adjustment and the phase shifting on the eighth optical signal to output the tenth optical signal. The second power regulator and the second phase shifter are configured to respectively perform the power adjustment and the phase shifting on the ninth optical signal to output the eleventh optical signal. The second optical coupler is configured to combine the sixth optical signal and the tenth optical signal, to output the twelfth optical signal with the frequency f0+f and cancel the residual signal of the sixth optical signal at f0. The third optical coupler is configured to combine the seventh optical signal and the eleventh optical signal, to output the thirteenth optical signal with the frequency f0−f and cancel the residual signal of the seventh optical signal at f0. In this way, quality of an output signal is improved.

Embodiment 7

Figure 7:
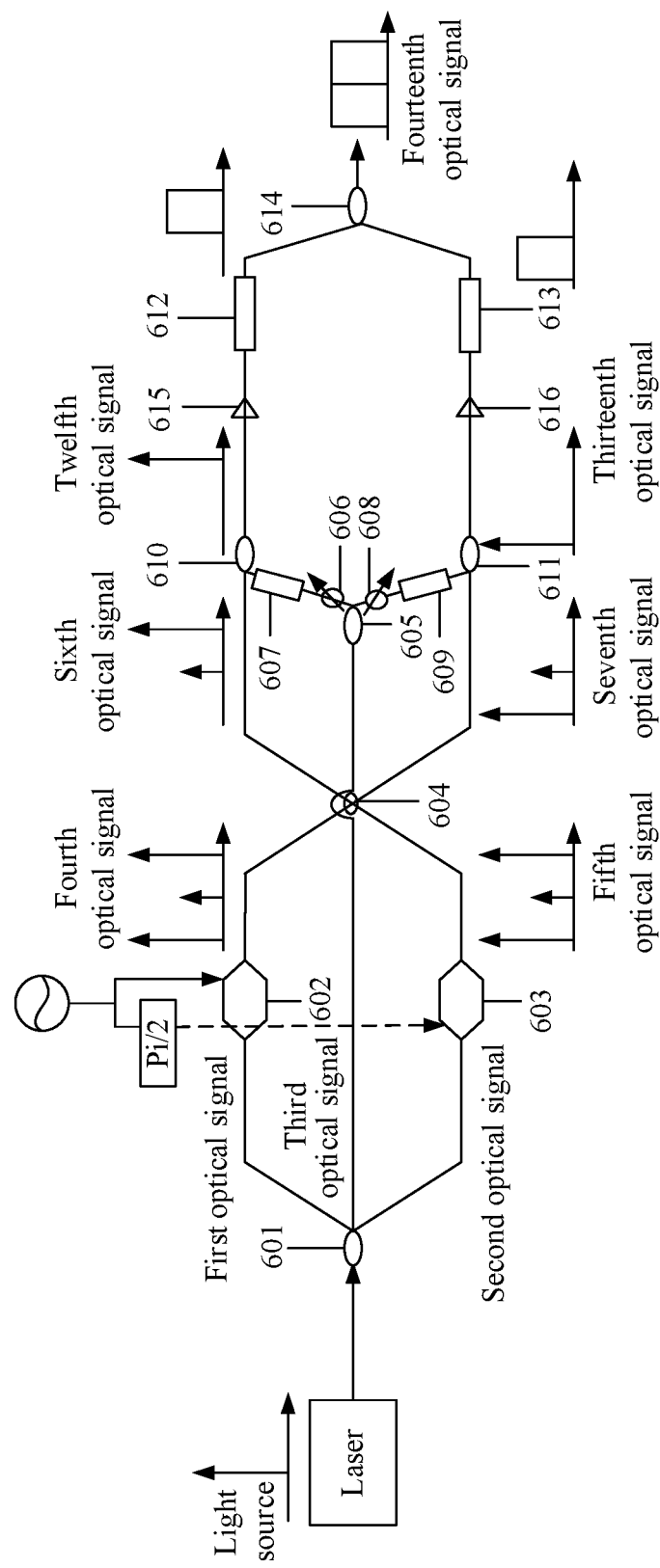
FIG. 7 is a schematic structural diagram of an optical device according to Embodiment 7 of this application.

Based on Embodiment 6, further, the optical device may be a multicarrier generator, a modulator, or a transmitter. Specifically, FIG. 7 is a schematic structural diagram of an optical device according to Embodiment 7 of this application. The optical device further includes a first modulator 612, a second modulator 613, and a fourth optical coupler 614. Optionally, the optical device further includes a first amplifier 615 and a second amplifier 616. All the components included in the optical device each have at least one input end and at least one output end. An output end of the second optical coupler 610 is connected to an input end of the first amplifier 615, and an output end of the first amplifier 615 is connected to an input end of the first modulator 612. An output end of the third optical coupler 611 is connected to an input end of the second amplifier 616, and an output end of the second amplifier 616 is connected to an input end of the second modulator 613. An output end of the first modulator 612 and an output end of the second modulator 613 are connected to input ends of the fourth optical coupler 614 respectively.

When the optical device does not include the first amplifier 615 and the second amplifier 616, the first modulator 612 is configured to modulate the twelfth optical signal, and the second modulator 613 is configured to modulate the thirteenth optical signal. The fourth optical coupler 614 is configured to couple the modulated twelfth optical signal and the modulated thirteenth optical signal into a fourteenth optical signal, and output the fourteenth optical signal. When the optical device includes the first amplifier 615 and the second amplifier 616, the first modulator 612 is configured to modulate the twelfth optical signal amplified by the first amplifier 615, and the second modulator 613 is configured to modulate the thirteenth optical signal amplified by the second amplifier 616. The fourth optical coupler 614 is configured to couple the modulated twelfth optical signal and the modulated thirteenth optical signal into a fourteenth optical signal, and output the fourteenth optical signal. As shown in FIG. 6, it can be learned from a frequency spectrum that the fourteenth optical signal includes an upper sideband and a lower sideband (that is, the modulated twelfth optical signal and the modulated thirteenth optical signal).

Optionally, the first modulator 612 and the second modulator 613 may both be dual-polarization IQ modulators. The fourth optical coupler 614 may be a 1-input 2-output coupler, that is, a 1×2 coupler.

The optical device may combine the sixth optical signal and the tenth optical signal, to output the twelfth optical signal with the frequency f0+f and cancel the residual signal of the sixth optical signal at f0, and combine the seventh optical signal and the eleventh optical signal, to output the thirteenth optical signal with the frequency f0−f and cancel the residual signal of the seventh optical signal at f0. The optical device is further configured to modulate the twelfth optical signal and the thirteenth optical signal, and couple the modulated twelfth optical signal and the modulated thirteenth optical signal into the fourteenth optical signal. In this way, quality of an output signal is improved.

Embodiment 8

Figure 8:
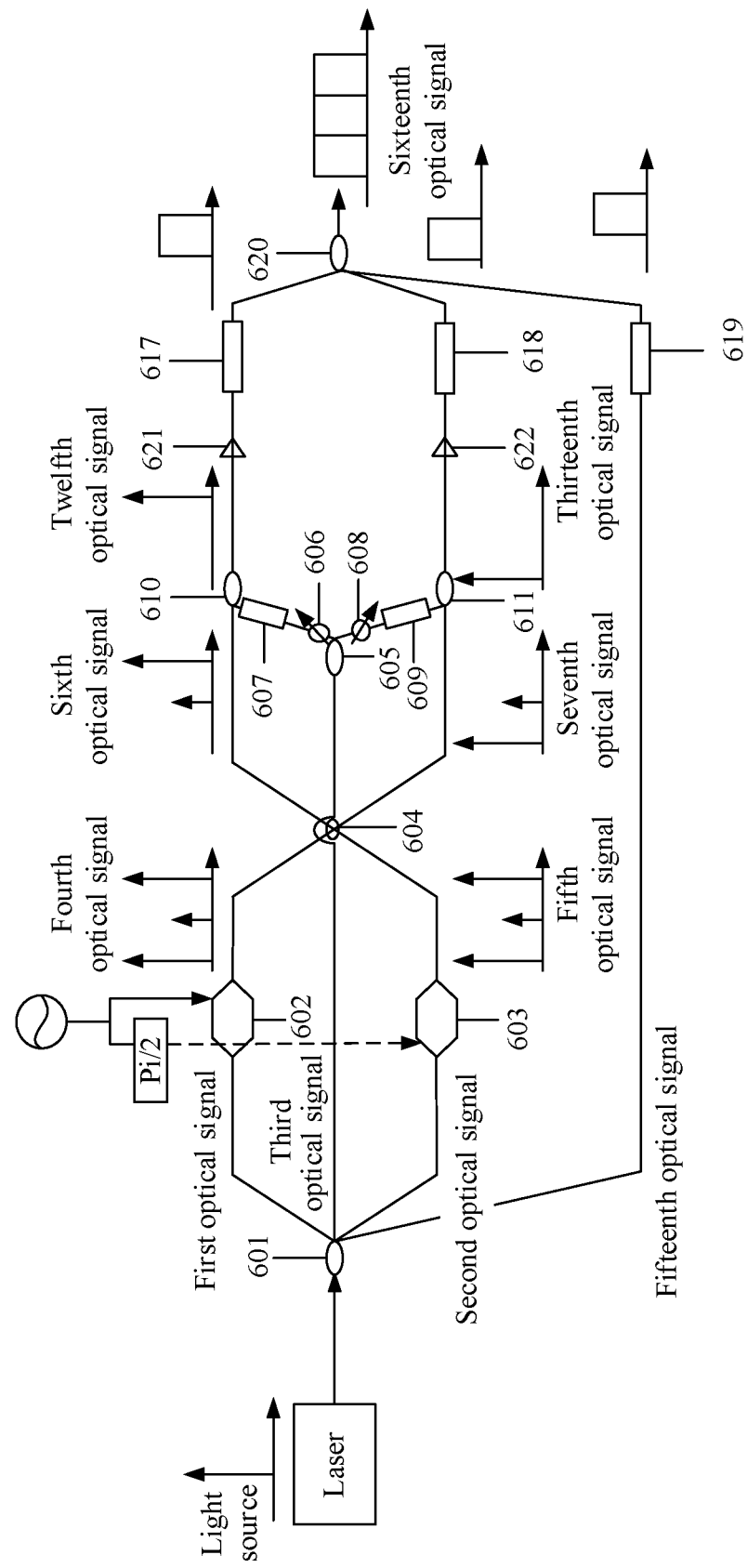
FIG. 8 is a schematic structural diagram of an optical device according to Embodiment 8 of this application.

Based on Embodiment 6, the optical device may be a multicarrier generator, a modulator, or a transmitter. Specifically, FIG. 8 is a schematic structural diagram of an optical device according to Embodiment 8 of this application. The at least three optical signals formed by the first optical splitter 601 further include a fifteenth optical signal. Based on this, the optical device further includes a third modulator 617, a fourth modulator 618, a fifth modulator 619, and a fifth optical coupler 620. Optionally, the optical device further includes a third amplifier 621 and a fourth amplifier 622. All the components included in the optical device each have at least one input end and at least one output end. An output end of the second optical coupler 610 is connected to an input end of the third amplifier 621, and an output end of the third amplifier 621 is connected to an input end of the third modulator 617. An output end of the third optical coupler 611 is connected to an input end of the fourth amplifier 622, and an output end of the fourth amplifier 622 is connected to an input end of the fourth modulator 618. An output end of the first optical splitter 601 is connected to an input end of the fifth modulator 619. An output end of the third modulator 617, an output end of the fourth modulator 618, and an output end of the fifth modulator 619 are connected to input ends of the fifth optical coupler 620 respectively.

When the optical device does not include the third amplifier 621 and the fourth amplifier 622, the third modulator 617 is configured to modulate the twelfth optical signal, the fourth modulator 618 is configured to modulate the thirteenth optical signal, and the fifth modulator 619 is configured to modulate the fifteenth optical signal. The fifth optical coupler 620 is configured to couple the modulated twelfth optical signal, the modulated thirteenth optical signal, and the modulated fifteenth optical signal into a sixteenth optical signal, and output the sixteenth optical signal. When the optical device includes the third amplifier 621 and the fourth amplifier 622, the third modulator 617 is configured to modulate the twelfth optical signal amplified by the third amplifier 621, the fourth modulator 618 is configured to modulate the thirteenth optical signal amplified by the fourth amplifier 622, and the fifth modulator 619 is configured to modulate the fifteenth optical signal. The fifth optical coupler 620 is configured to couple the modulated twelfth optical signal, the modulated thirteenth optical signal, and the modulated fifteenth optical signal into a sixteenth optical signal, and output the sixteenth optical signal. As shown in FIG. 8, it can be seen from a frequency spectrum that the finally coupled sixteenth optical signal may be divided into three subcarriers. The three subcarriers are formed through modulation performed by the third modulator 617, the fourth modulator 618, and the fifth modulator 619 respectively. Therefore, multicarrier modulation in any manner can be implemented. As shown in FIG. 8, the three carriers may be arranged orthogonally, overlapped non-orthogonally, or modulated into subcarriers with different rates, to implement flexible modulation.

The optical device may combine the sixth optical signal and the tenth optical signal, to output the twelfth optical signal with the frequency f0+f and cancel the residual signal of the sixth optical signal at f0, and combine the seventh optical signal and the eleventh optical signal, to output the thirteenth optical signal with the frequency f0−f and cancel the residual signal of the seventh optical signal at f0. The optical device is further configured to modulate the twelfth optical signal and the thirteenth optical signal, and couple the modulated twelfth optical signal, the modulated thirteenth optical signal, and the modulated fifteenth optical signal into the sixteenth optical signal. In this way, quality of an output signal is improved. Further, the finally coupled sixteenth optical signal may be divided into the three subcarriers. The three subcarriers are formed through the modulation performed by the third modulator, the fourth modulator, and the fifth modulator respectively. Therefore, multicarrier modulation in any manner can be implemented, to implement flexible modulation.

Embodiment 9

Figure 9:
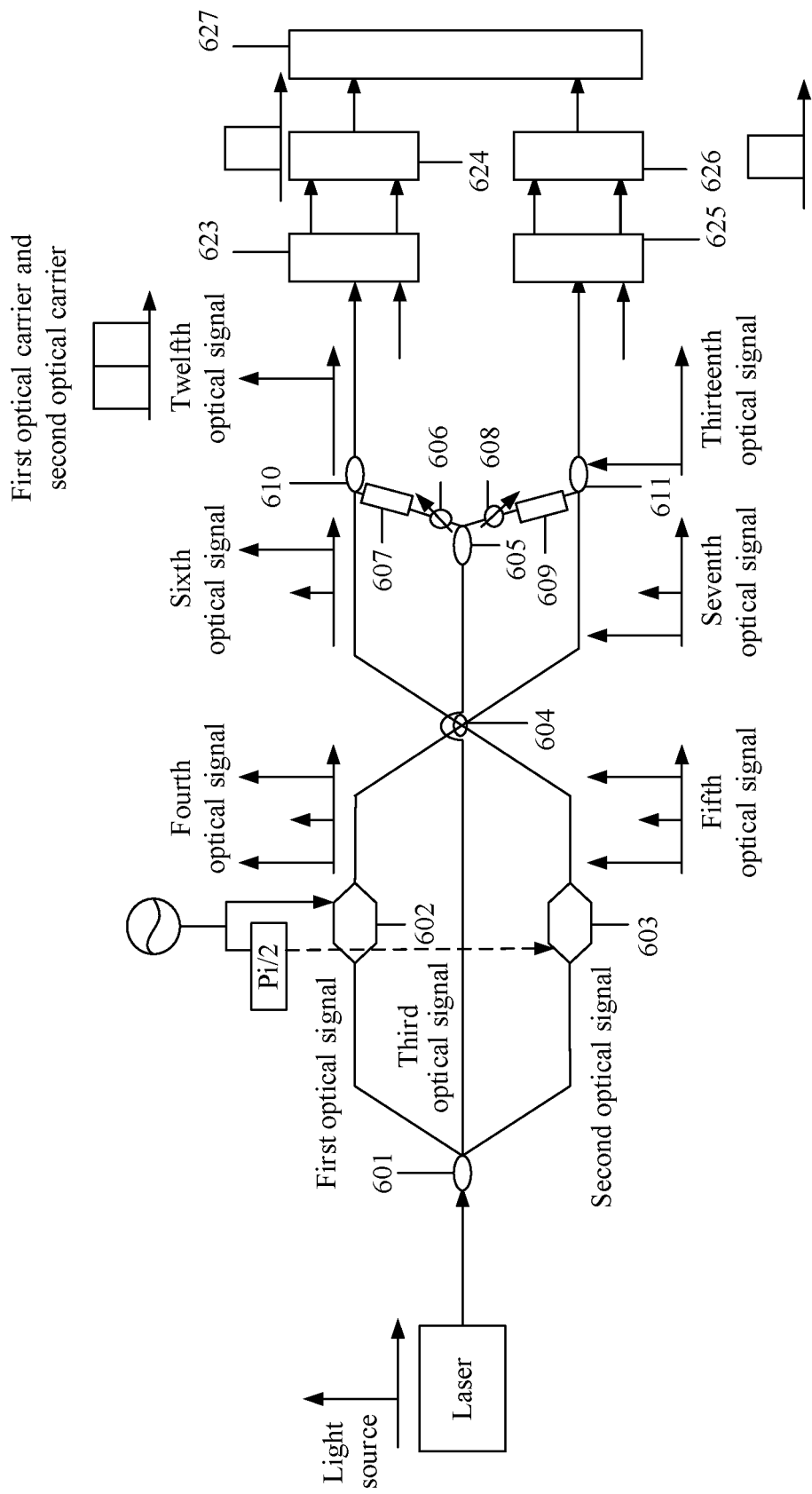
FIG. 9 is a schematic structural diagram of an optical device according to Embodiment 9 of this application.

Based on Embodiment 6, the optical device may be a multicarrier generator, a modulator, or a receiver. Specifically, FIG. 9 is a schematic structural diagram of an optical device according to Embodiment 9 of this application. As shown in FIG. 9, the optical device further includes a first ICR 623, a first ADC 624, a second ICR 625, a second ADC 626, and a processor 627. All the components included in the optical device each have at least one input end and at least one output end. An output end of the second optical coupler 610 is connected to an input end of the first ICR 623, an output end of the first ICR 623 is connected to an input end of the first ADC 624, and an output end of the first ADC 624 is connected to the processor 627. An output end of the third optical coupler 611 is connected to an input end of the second ICR 625, an output end of the second ICR 625 is connected to an input end of the second ADC 626, and an output end of the second ADC 626 is connected to the processor 627.

Specifically, the first ICR 623 is configured to receive a first optical carrier, and perform coherent detection on the twelfth optical signal and the first optical carrier to obtain a first coherent detection signal. The coherent detection method in this application is based on the prior art, and details are not described in this application. The first ADC 626 is configured to perform analog-to-digital conversion on the first coherent detection signal to obtain a first digital signal. The second ICR 625 is configured to receive a second optical carrier, and perform coherent detection on the thirteenth optical signal and the second optical carrier to obtain a second coherent detection signal. The second ADC 626 is configured to perform analog-to-digital conversion on the second coherent detection signal to obtain a second digital signal. The processor 627 is configured to process the first digital signal and the second digital signal. The processor 125 may be a DSP, a CPU, an MCU, or the like. This is not limited in this application.

This application provides the optical device, where the output twelfth optical signal and the output thirteenth optical signal may be used as local oscillator light sources of the first ICR and the second ICR respectively. The first ICR and the second ICR receive the two carriers, perform the coherent detection on the corresponding carriers and the local oscillator light sources, and output the coherent detection signals to the first ADC and the second ADC respectively. The first ADC and the second ADC perform the analog-to-digital conversion on the corresponding coherent detection signals to obtain the first digital signal and the second digital signal respectively. The processor 627 may separately process the first digital signal and the second digital signal, or may jointly process the first digital signal and the second digital signal, to achieve a beneficial effect of eliminating mutual crosstalk between some carriers.

Embodiment 10

Figure 10:
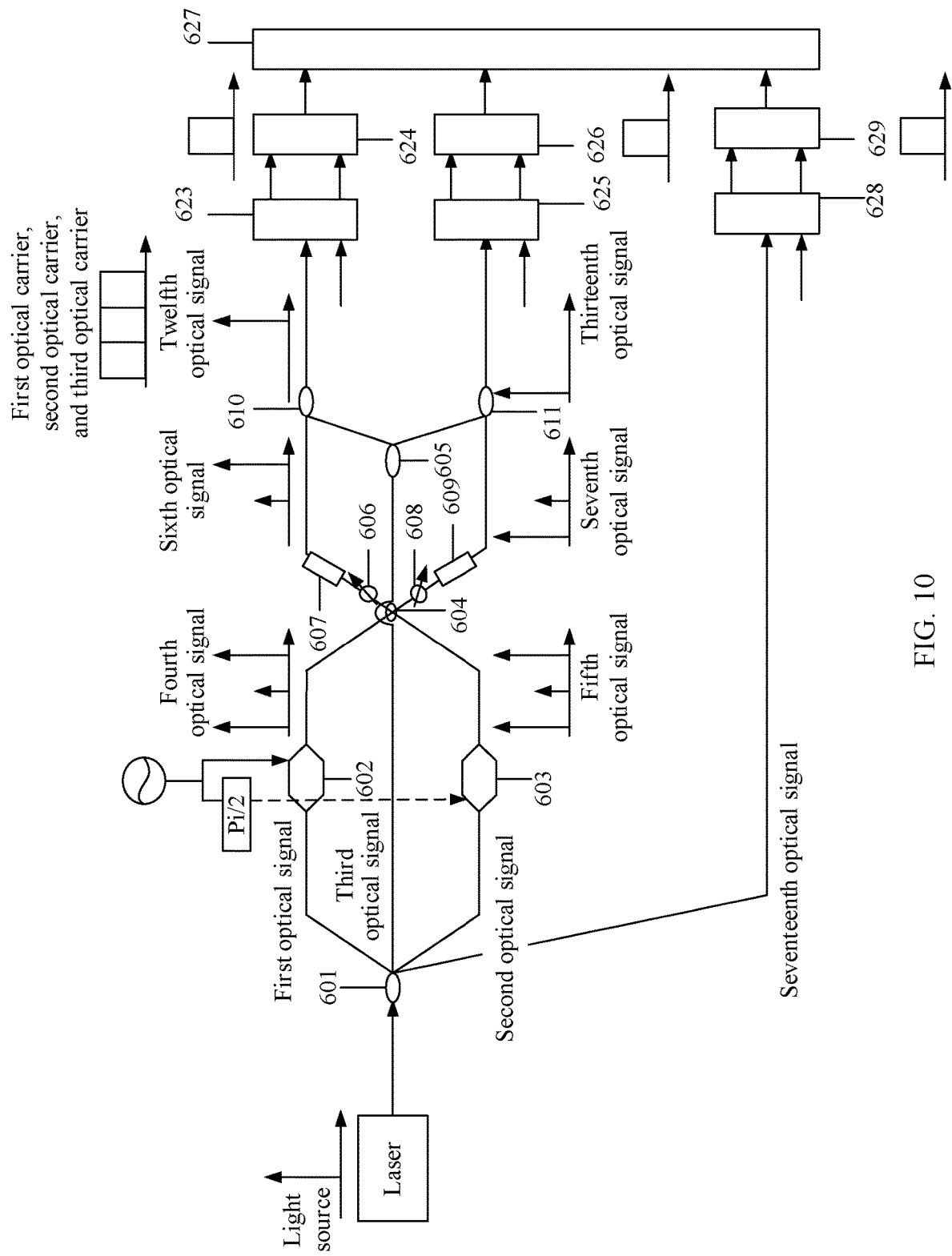
FIG. 10 is a schematic structural diagram of an optical device according to Embodiment 10 of this application.

Based on Embodiment 9, the at least three optical signals formed by the first optical splitter 601 further include a seventeenth optical signal. Based on this, the optical device further includes a third ICR and a third ADC. All the components included in the optical device each have at least one input end and at least one output end. Specifically, FIG. 10 is a schematic structural diagram of an optical device according to Embodiment 10 of this application. As shown in FIG. 10, an output end of the optical splitter 601 is connected to an input end of the third ICR 628, an output end of the third ICR 628 is connected to an input end of the third ADC 629, and an output end of the third ADC 629 is connected to the processor 627.

Specifically, the third ICR 628 is configured to receive a third optical carrier, and perform coherent detection on the seventeenth optical signal and the third optical carrier to obtain a third coherent detection signal. The third ADC 629 is configured to perform analog-to-digital conversion on the third coherent detection signal to obtain a third digital signal. The processor 627 is further configured to process the third digital signal. The processor 627 may separately process the first digital signal, the second digital signal, and the third digital signal, or may jointly process the first digital signal, the second digital signal, and the third digital signal.

Aspects of this application provides the optical device, where the output twelfth optical signal, the output thirteenth optical signal, and the output seventeenth optical signal may be used as local oscillator light sources of the first ICR, the second ICR and the third ICR respectively. The first ICR, the second ICR, and the third ICR receive the three carriers, perform the coherent detection on the corresponding carriers and the local oscillator light sources, and output the coherent detection signals to the first ADC, the second ADC, and the third ADC respectively. The first ADC, the second ADC, and the third ADC perform the analog-to-digital conversion on the corresponding coherent detection signals to obtain the first digital signal, the second digital signal, and the third digital signal respectively. The processor may separately process the first digital signal, the second digital signal, and the third digital signal, or may jointly process the first digital signal, the second digital signal, and the third digital signal, to achieve a beneficial effect of eliminating mutual crosstalk between some carriers.

Embodiment 11

Figure 11:
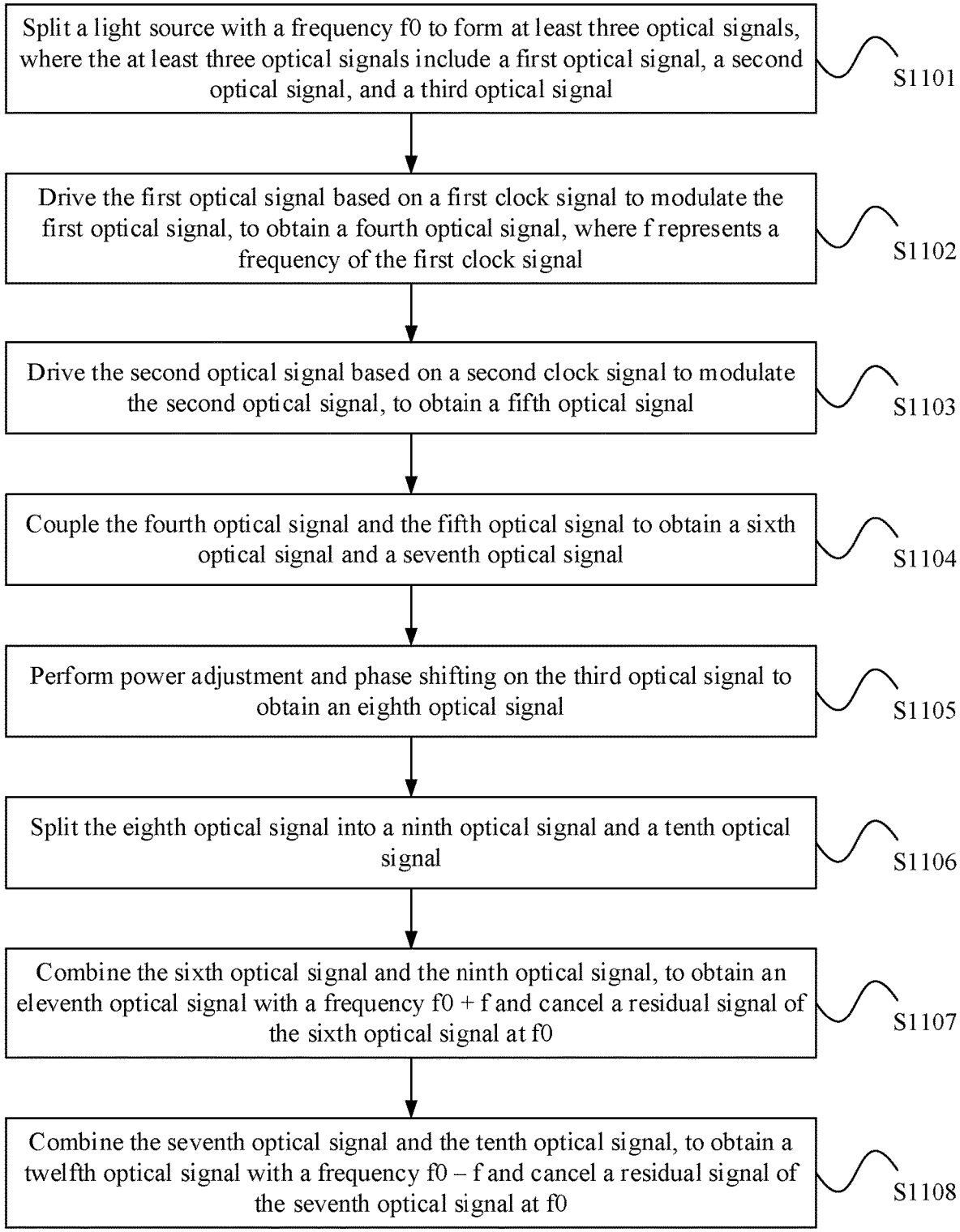
FIG. 11 is a flowchart of an optical signal processing method according to an embodiment of this application.

FIG. 11 is a flowchart of an optical signal processing method according to an embodiment of this application. The method is performed by an optical device. The optical device may be a multicarrier generator, a modulator, a transmitter, a receiver, or the like. This is not limited in this application. As shown in FIG. 11, the method includes the following steps.

Step S1101: Split a light source with a frequency f0 to form at least three optical signals, where the at least three optical signals include a first optical signal, a second optical signal, and a third optical signal.

Step S1102: Drive the first optical signal based on a first clock signal to modulate the first optical signal, to obtain a fourth optical signal, where f represents a frequency of the first clock signal.

Step S1103: Drive the second optical signal based on a second clock signal to modulate the second optical signal, to obtain a fifth optical signal.

The first clock signal is $\cos(2\pi\ ft)$. The second clock signal is $\sin(2\pi\ ft)$.

Step S1104: Couple the fourth optical signal and the fifth optical signal to obtain a sixth optical signal and a seventh optical signal.

Step S1105: Perform power adjustment and phase shifting on the third optical signal to obtain an eighth optical signal.

Step S1106: Split the eighth optical signal into a ninth optical signal and a tenth optical signal.

Step S1107: Combine the sixth optical signal and the ninth optical signal, to obtain an eleventh optical signal with a frequency f0+f and cancel a residual signal of the sixth optical signal at f0.

Step S1108: Combine the seventh optical signal and the tenth optical signal, to obtain a twelfth optical signal with a frequency f0−f and cancel a residual signal of the seventh optical signal at f0.

Optionally, the first clock signal and the second clock signal are generated by a same clock source, or the first clock signal and the second clock signal are generated by two phase synchronized clock sources.

This optical signal processing method may be performed by the optical device described in Embodiment 1, and content and effects of the optical device are not described herein again.

Embodiment 12

Figure 12A:
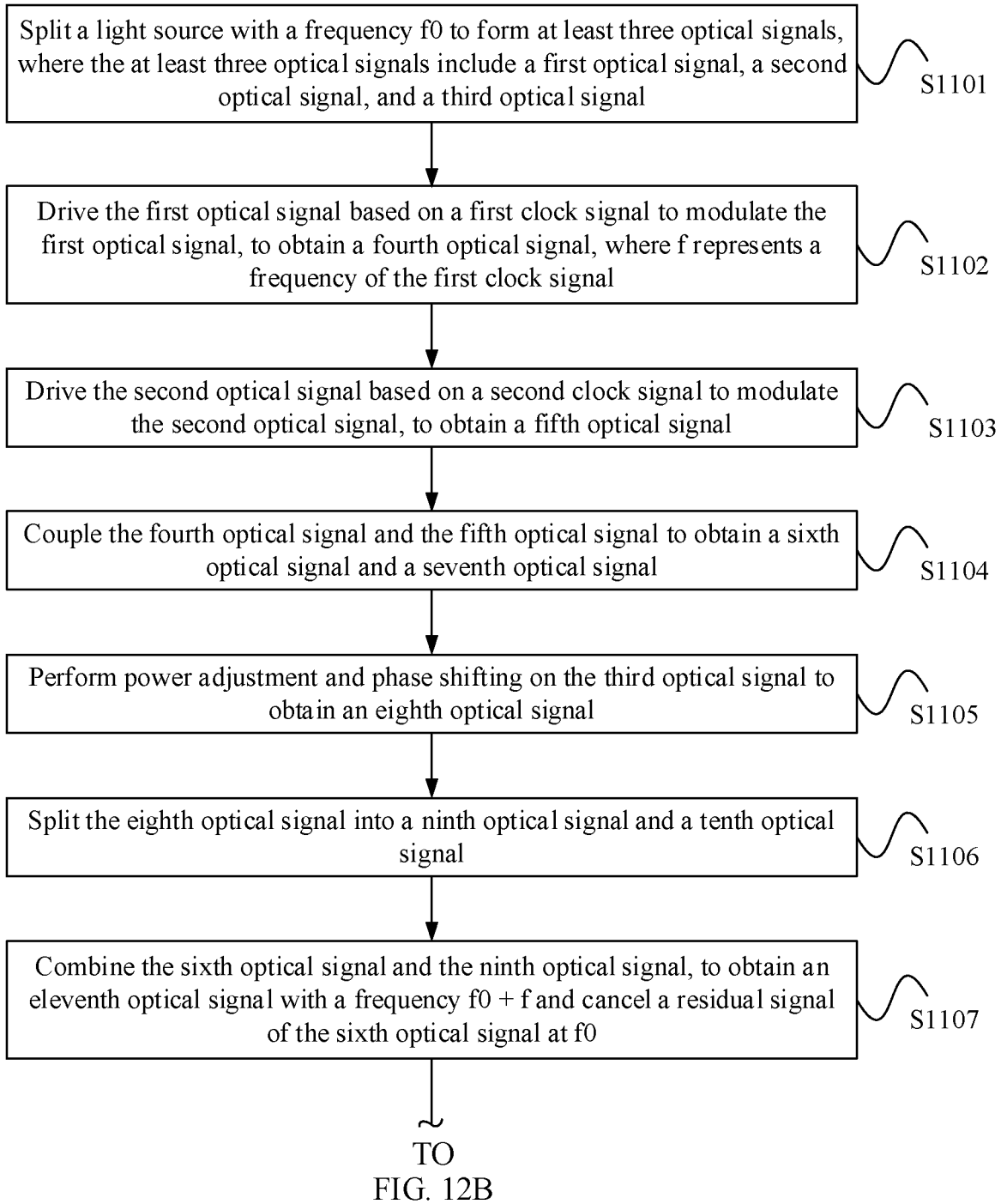

FIG. 12A and FIG. 12B are a flowchart of an optical signal processing method according to another embodiment of this application. As shown in FIG. 12B, after step S1108 of Embodiment 11, the optical signal processing method further includes the following steps.

Step S1109*a*: Modulate the eleventh optical signal.
Step S1110*a*: Modulate the twelfth optical signal.
Step S1111*a*: Couple the modulated eleventh optical signal and the modulated twelfth optical signal into a thirteenth optical signal, and output the thirteenth optical signal.

This optical signal processing method may be performed by the optical device described in Embodiment 2, and content and effects of the optical device are not described herein again.

Embodiment 13

Figure 13A:
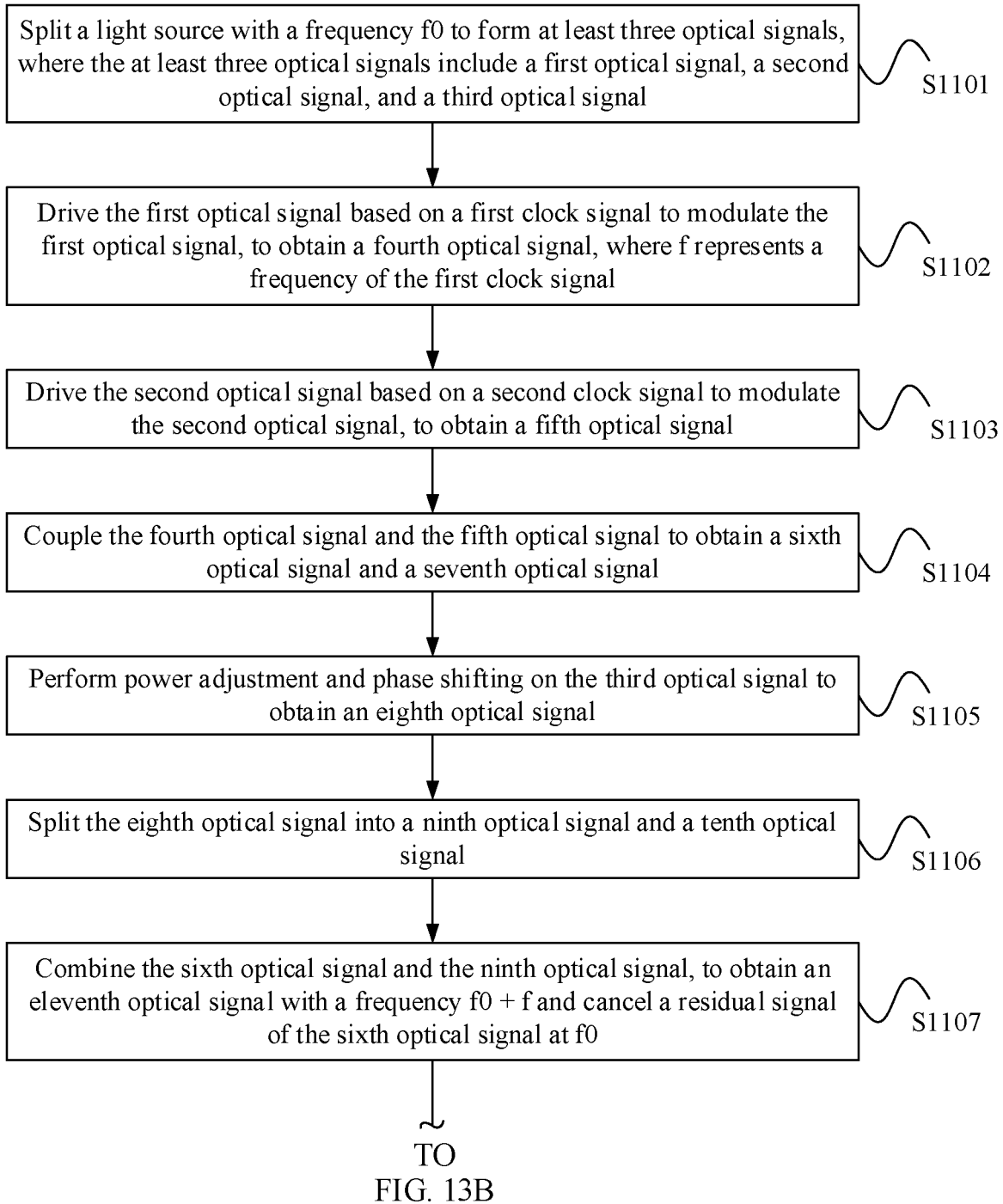

FIG. 13A and FIG. 13B are a flowchart of an optical signal processing method according to still another embodiment of this application. The at least three optical signals further include a fourteenth optical signal. As shown in FIG. 13B, after step S1108 of Embodiment 11, the optical signal processing method further includes the following steps.

Step S1109b: Modulate the eleventh optical signal.
Step S1110b: Modulate the twelfth optical signal.
Step S1111b: Modulate the fourteenth optical signal.
Step S1112b: Couple the modulated eleventh optical signal, the modulated twelfth optical signal, and the modulated fourteenth optical signal into a fifteenth optical signal, and output the fifteenth optical signal.

This optical signal processing method may be performed by the optical device described in Embodiment 3, and content and effects of the optical device are not described herein again.

Embodiment 14

Figure 14A:
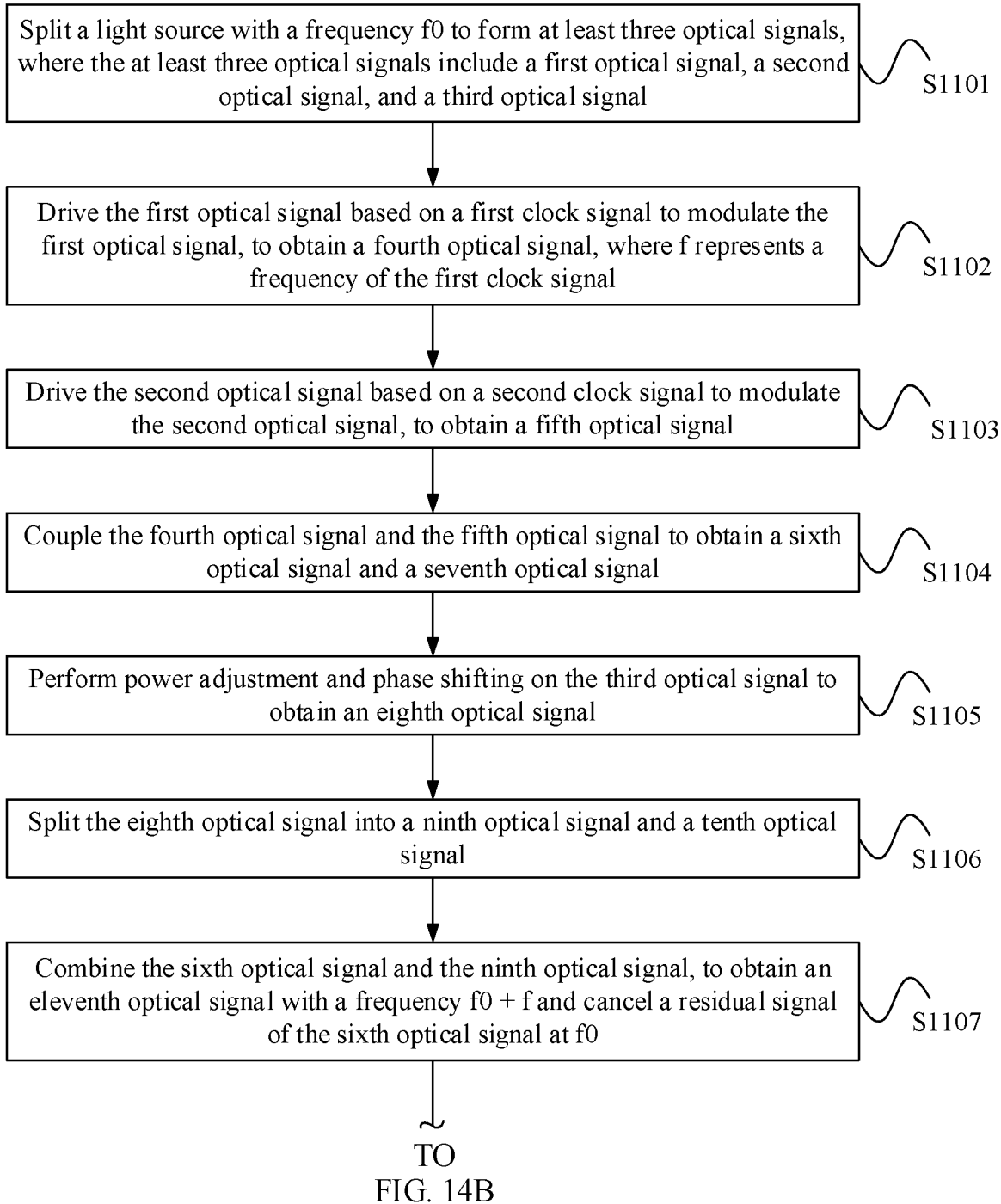

FIG. 14A and FIG. 14B are a flowchart of an optical signal processing method according to yet another embodiment of this application. As shown in FIG. 14B, after step S1108 of Embodiment 11, the optical signal processing method further includes the following steps.

Step S1109c: Receive a first optical carrier, and perform coherent detection on the eleventh optical signal and the first optical carrier to obtain a first coherent detection signal.

Step S1110c: Perform analog-to-digital conversion on the first coherent detection signal to obtain a first digital signal.

Step S1111c: Receive a second optical carrier, and perform coherent detection on the twelfth optical signal and the second optical carrier to obtain a second coherent detection signal.

Step S1112c: Perform analog-to-digital conversion on the second coherent detection signal to obtain a second digital signal.

Step S1113c: Process the first digital signal and the second digital signal.

This optical signal processing method may be performed by the optical device described in Embodiment 4, and content and effects of the optical device are not described herein again.

Embodiment 15

Figure 15A:
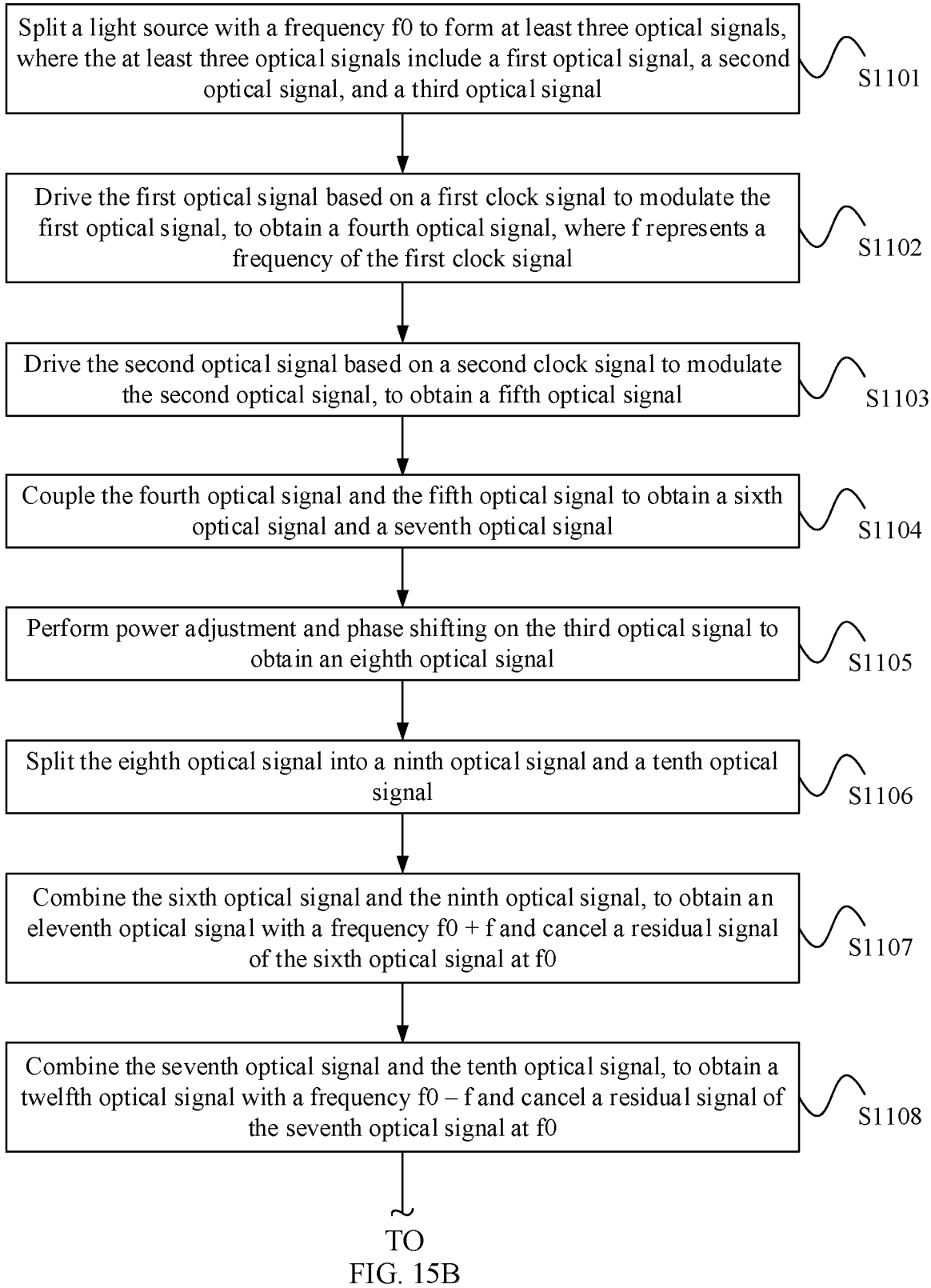
FIG. 15A and FIG. 15B are a flowchart of an optical signal processing method according to still yet another embodiment of this application.
Figure 15B:
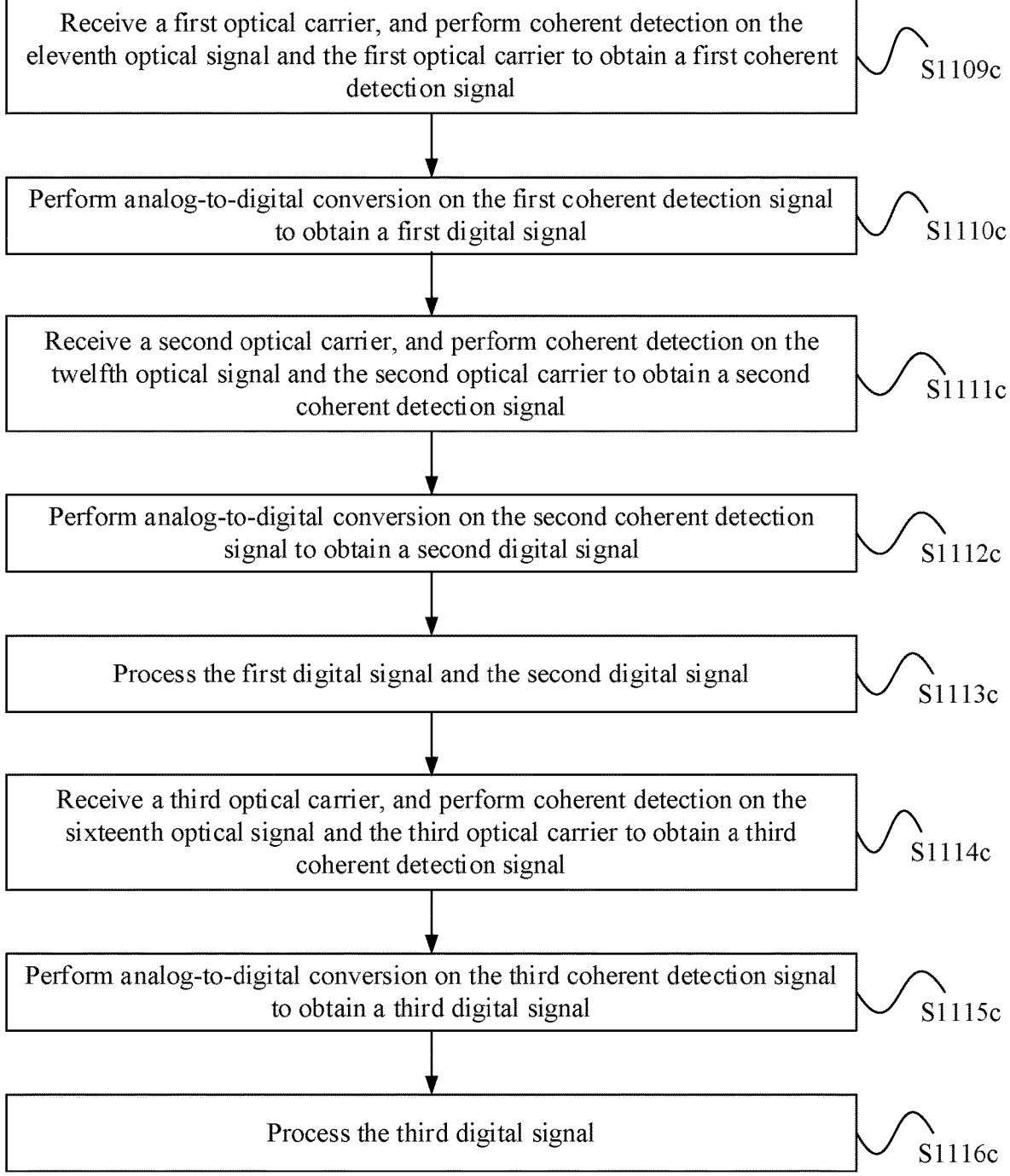

FIG. 15A and FIG. 15B are a flowchart of an optical signal processing method according to still yet another embodiment of this application. The at least three optical signals further include a sixteenth optical signal. As shown in FIG. 15B, based on Embodiment 14, the optical signal processing method further includes the following steps.

Step S1114c: Receive a third optical carrier, and perform coherent detection on the sixteenth optical signal and the third optical carrier to obtain a third coherent detection signal.

Step S1115c: Perform analog-to-digital conversion on the third coherent detection signal to obtain a third digital signal.

Step S1116c: Process the third digital signal.

It should be noted that step S1113c and step S1116c may be separately performed, that is, the optical device may separately process the first digital signal, the second digital signal, and the third digital signal. Alternatively, step S1113c and step S1116c may be jointly performed, that is, the optical device may jointly process the first digital signal, the second digital signal, and the third digital signal. This is not limited in this application.

This optical signal processing method may be performed by the optical device described in Embodiment 5, and content and effects of the optical device are not described herein again.

Embodiment 16

Figure 16:
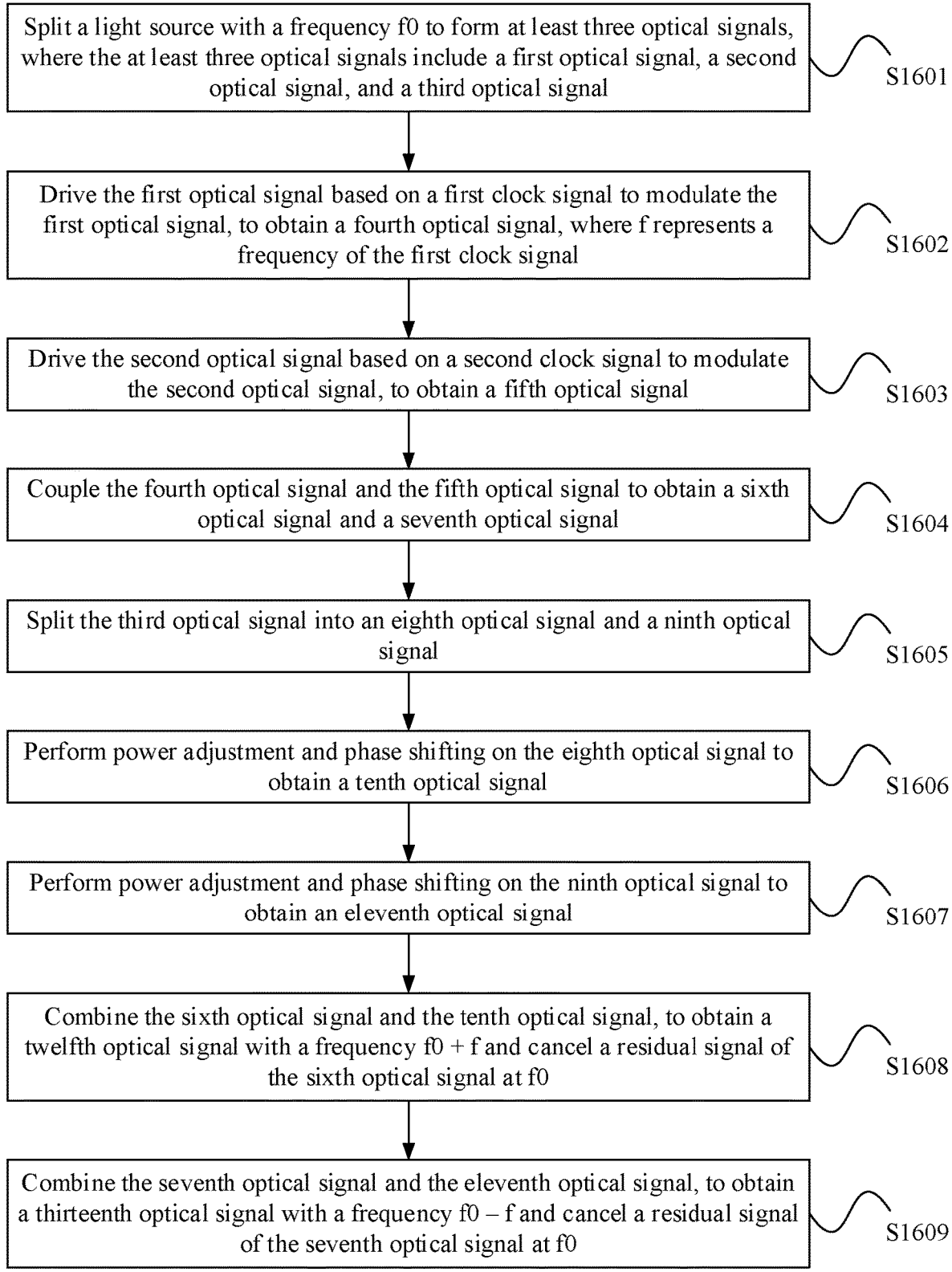
FIG. 16 is a flowchart of an optical signal processing method according to an embodiment of this application.

FIG. 16 is a flowchart of an optical signal processing method according to an embodiment of this application. The method is performed by an optical device. The optical device may be a multicarrier generator, a modulator, a transmitter, a receiver, or the like. This is not limited in this application. As shown in FIG. 16, the method includes the following steps.

Step S1601: Split a light source with a frequency f0 to form at least three optical signals, where the at least three optical signals include a first optical signal, a second optical signal, and a third optical signal.

Step S1602: Drive the first optical signal based on a first clock signal to modulate the first optical signal, to obtain a fourth optical signal, where f represents a frequency of the first clock signal.

Step S1603: Drive the second optical signal based on a second clock signal to modulate the second optical signal, to obtain a fifth optical signal.

The first clock signal is $\cos(2\pi\ ft)$. The second clock signal is $\sin(2\pi\ ft)$.

Step S1604: Couple the fourth optical signal and the fifth optical signal to obtain a sixth optical signal and a seventh optical signal.

Step S1605: split the third optical signal into an eighth optical signal and a ninth optical signal.

Step S1606: Perform power adjustment and phase shifting on the eighth optical signal to obtain a tenth optical signal.

Step S1607: Perform power adjustment and phase shifting on the ninth optical signal to obtain an eleventh optical signal.

Step S1608: Combine the sixth optical signal and the tenth optical signal, to obtain a twelfth optical signal with a frequency f0+f and cancel a residual signal of the sixth optical signal at f0.

Step S1609: Combine the seventh optical signal and the eleventh optical signal, to obtain a thirteenth optical signal with a frequency f0−f and cancel a residual signal of the seventh optical signal at f0.

Optionally, the first clock signal and the second clock signal are generated by a same clock source, or the first clock signal and the second clock signal are generated by two phase synchronized clock sources.

This optical signal processing method may be performed by the optical device described in Embodiment 6, and content and effects of the optical device are not described herein again.

Embodiment 17

Figure 17A:
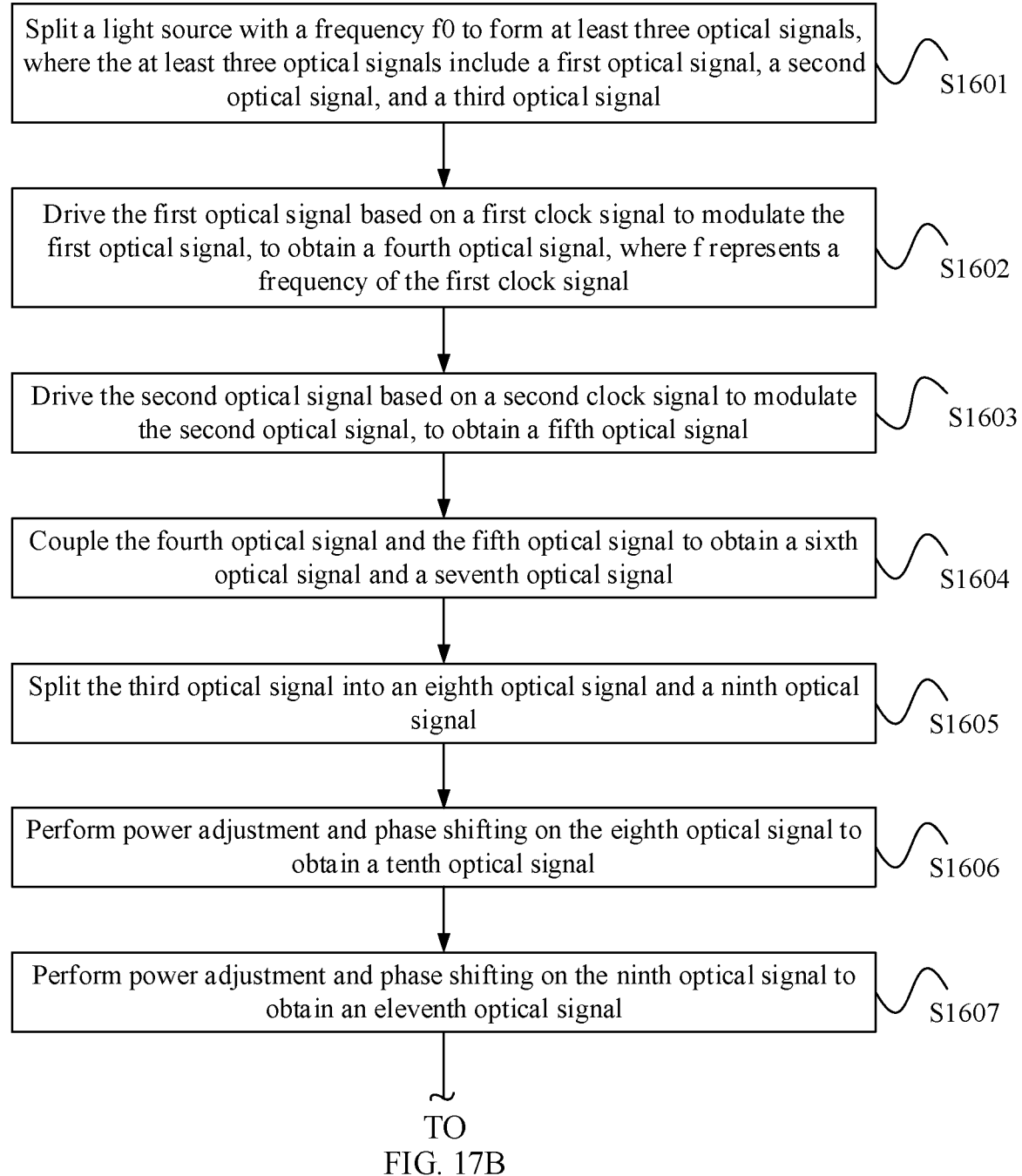

FIG. 17A and FIG. 17B are a flowchart of an optical signal processing method according to another embodiment of this application. As shown in FIG. 17B, after step S1609 of Embodiment 16, the optical signal processing method further includes the following steps.

Step S1610a: Modulate the twelfth optical signal.
Step S1611a: Modulate the thirteenth optical signal.
Step S1612a: Couple the modulated twelfth optical signal and the modulated thirteenth optical signal into a fourteenth optical signal, and output the fourteenth optical signal.

This optical signal processing method may be performed by the optical device described in Embodiment 7, and content and effects of the optical device are not described herein again.

Embodiment 18

Figure 18A:
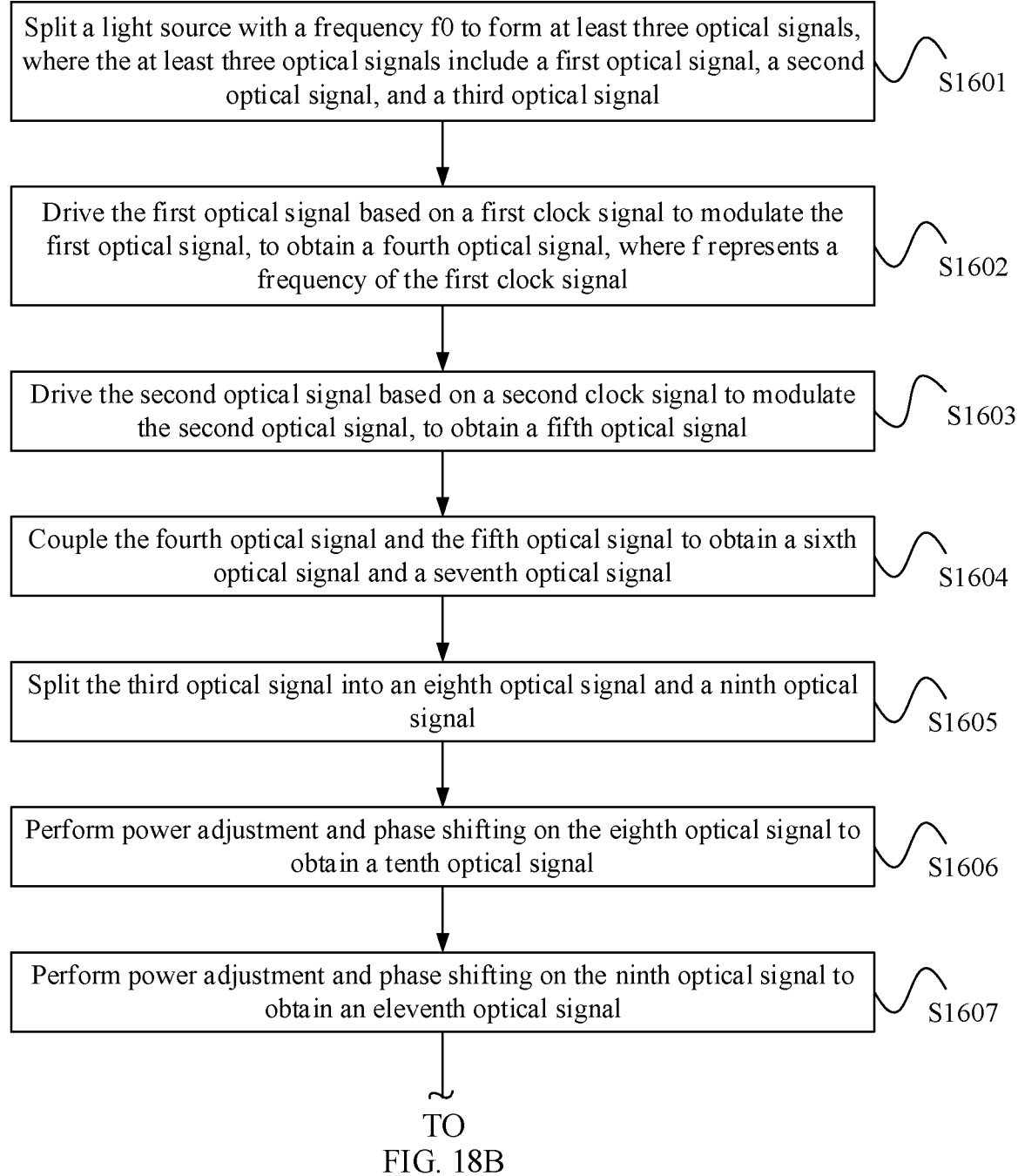

FIG. 18A and FIG. 18B are a flowchart of an optical signal processing method according to still another embodiment of this application. The at least three optical signals further include a fifteenth optical signal. As shown in FIG. 18B, after step S1609 of Embodiment 16, the optical signal processing method further includes the following steps.

Step S1610b: Modulate the twelfth optical signal.

Step S1611b: Modulate the thirteenth optical signal.

Step S1612b: Modulate the fifteenth optical signal.

Step S1613b: Couple the modulated twelfth optical signal, the modulated thirteenth optical signal, and the modulated fifteenth optical signal into a sixteenth optical signal, and output the sixteenth optical signal.

This optical signal processing method may be performed by the optical device described in Embodiment 8, and content and effects of the optical device are not described herein again.

Embodiment 19

Figure 19A:
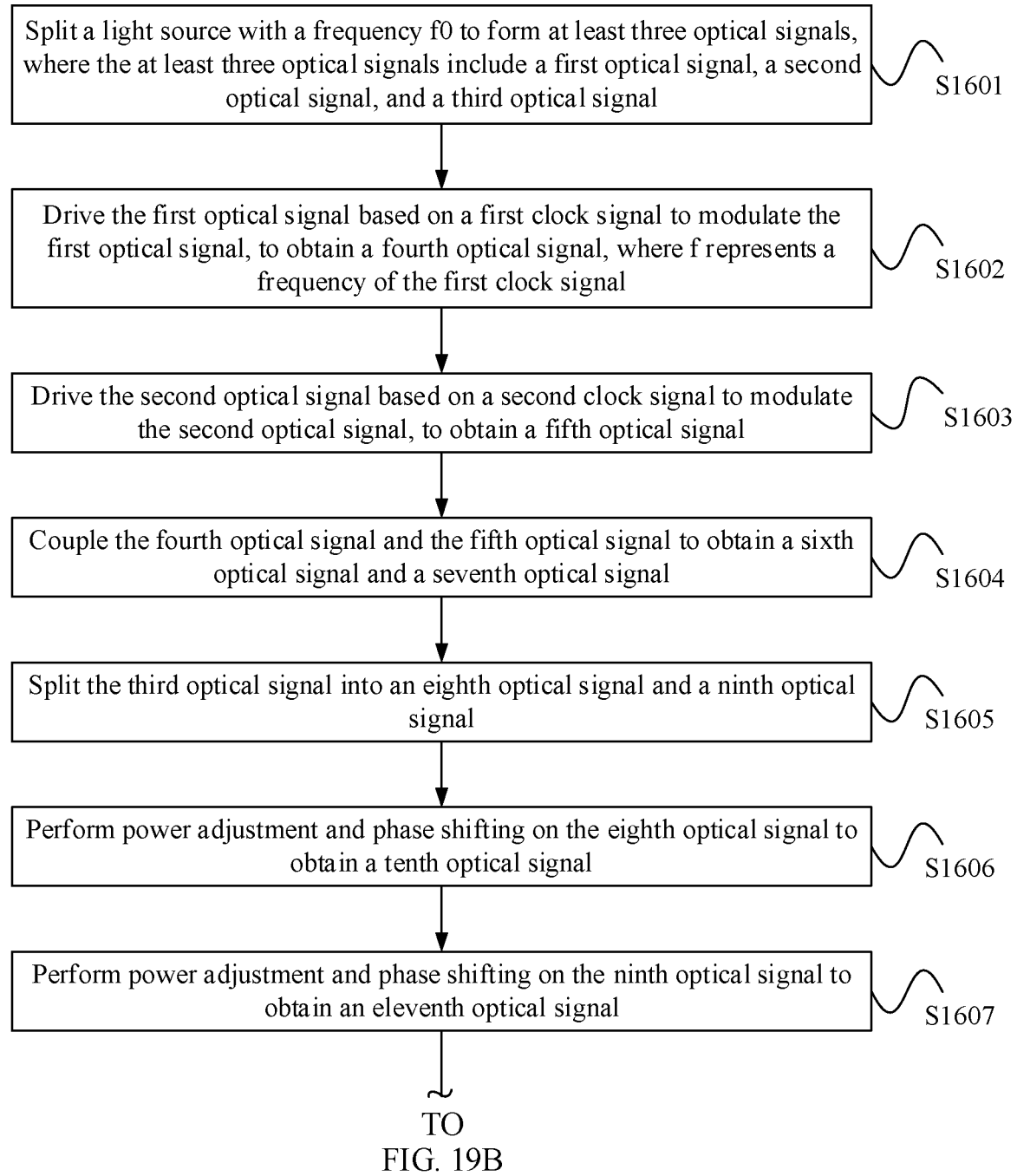

FIG. 19A and FIG. 19B are a flowchart of an optical signal processing method according to yet another embodiment of this application. As shown in FIG. 19B, after step S1609 of Embodiment 16, the optical signal processing method further includes the following steps.

Step S1610c: Receive a first optical carrier, and perform coherent detection on the twelfth optical signal and the first optical carrier to obtain a first coherent detection signal.

Step S1611c: Perform analog-to-digital conversion on the first coherent detection signal to obtain a first digital signal.

Step S1612c: Receive a second optical carrier, and perform coherent detection on the thirteenth optical signal and the second optical carrier to obtain a second coherent detection signal.

Step S1613c: Perform analog-to-digital conversion on the second coherent detection signal to obtain a second digital signal.

Step S1614c: Process the first digital signal and the second digital signal.

This optical signal processing method may be performed by the optical device described in Embodiment 9, and content and effects of the optical device are not described herein again.

Embodiment 20

Figure 20A:
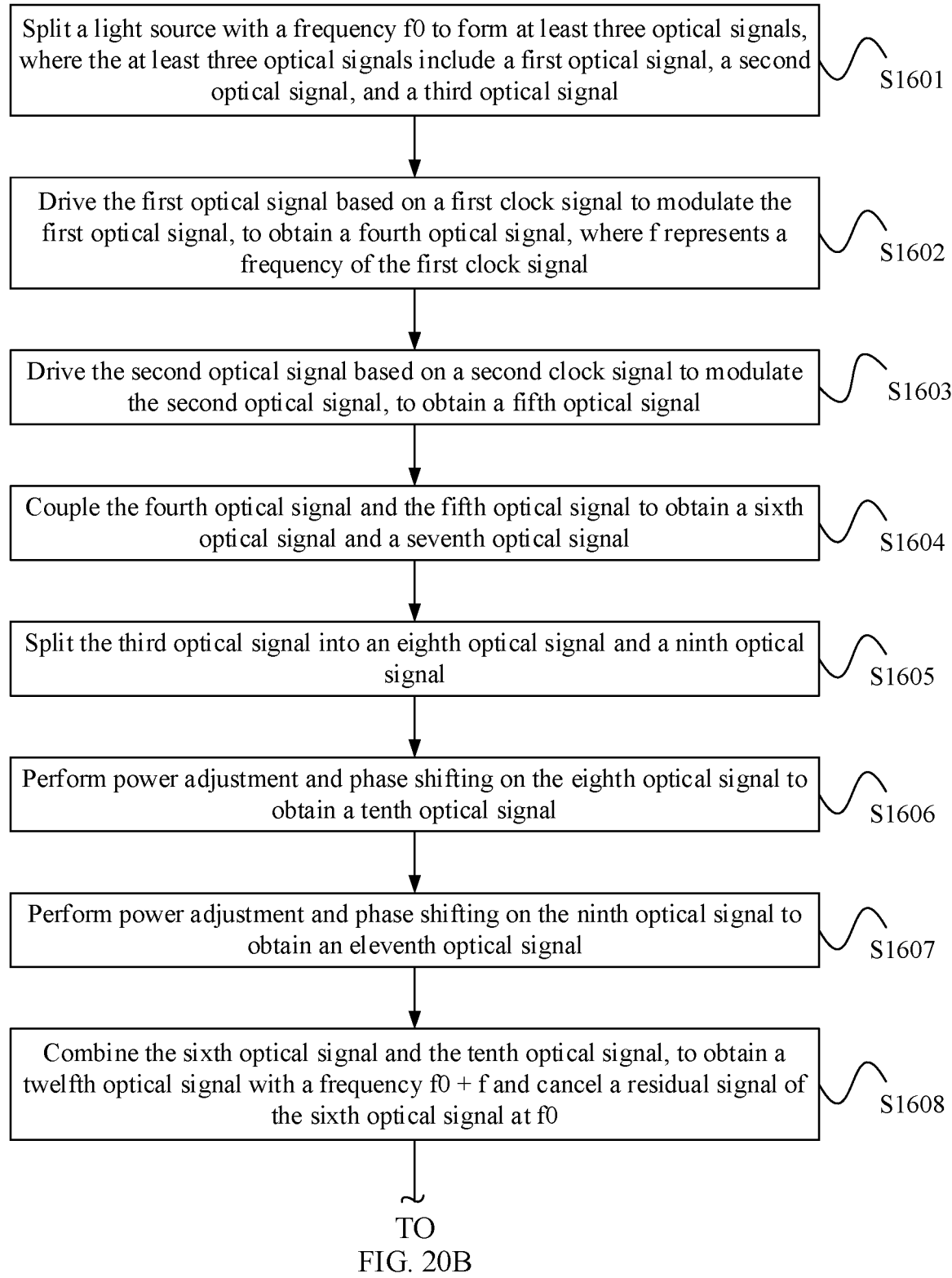

FIG. 20A and FIG. 20B are a flowchart of an optical signal processing method according to still yet another embodiment of this application. The at least three optical signals further include a seventeenth optical signal. As shown in FIG. 20B, based on Embodiment 19, the optical signal processing method further includes the following steps.

Step S1615c: Receive a third optical carrier, and perform coherent detection on the seventeenth optical signal and the third optical carrier to obtain a third coherent detection signal.

Step S1616c: Perform analog-to-digital conversion on the third coherent detection signal to obtain a third digital signal.

Step S1617c: Process the third digital signal.

It should be noted that step S1614c and step S1617c may be separately performed, that is, the optical device may separately process the first digital signal, the second digital signal, and the third digital signal. Alternatively, step S1614c and step S1617c may be jointly performed, that is, the optical device may jointly process the first digital signal, the second digital signal, and the third digital signal. This is not limited in this application.

This optical signal processing method may be performed by the optical device described in Embodiment 10, and content and effects of the optical device are not described herein again.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical device, comprising:
    a first optical splitter, configured to split a light source with a frequency f0; to obtain at least three optical signals, wherein the at least three optical signals comprise a first optical signal, a second optical signal, and a third optical signal;
    a first Mach-Zehnder (MZ) modulator, configured to drive the first optical signal based on a first clock signal $\cos(2\pi ft)$ to modulate the first optical signal, to output a fourth optical signal, wherein f represents a frequency of the first clock signal;
    a second MZ modulator, configured to drive the second optical signal based on a second clock signal $\sin(2\pi ft)$ to modulate the second optical signal, to output a fifth optical signal;
    a first optical coupler, configured to couple the fourth optical signal and the fifth optical signal to output a sixth optical signal and a seventh optical signal;
    a power regulator and a phase shifter, respectively configured to perform power adjustment and phase shifting on the third optical signal to output an eighth optical signal;
    a second optical splitter, configured to split the eighth optical signal into a ninth optical signal and a tenth optical signal;
    a second optical coupler, configured to combine the sixth optical signal and the ninth optical signal, to output an eleventh optical signal with a frequency f0+f and cancel a residual signal of the sixth optical signal at f0; and
    a third optical coupler, configured to combine the seventh optical signal and the tenth optical signal, to output a twelfth optical signal with a frequency f0−f and cancel a residual signal of the seventh optical signal at f0.

2. The optical device according to claim 1, wherein the first clock signal and the second clock signal are generated by a same clock source, or the first clock signal and the second clock signal are generated by two phase synchronized clock sources.

3. The optical device according to claim 1, further comprising:
    a first modulator, configured to modulate the eleventh optical signal;
    a second modulator, configured to modulate the twelfth optical signal; and
    a fourth optical coupler, configured to couple the modulated eleventh optical signal and the modulated twelfth optical signal into a thirteenth optical signal, and output the thirteenth optical signal.

4. The optical device according to claim 1, wherein the at least three optical signals further comprise a fourteenth optical signal, and the optical device further comprises:
    a third modulator, configured to modulate the eleventh optical signal;
    a fourth modulator, configured to modulate the twelfth optical signal;

a fifth modulator, configured to modulate the fourteenth optical signal; and a fifth optical coupler, configured to couple the modulated eleventh optical signal, the modulated twelfth optical signal, and the modulated fourteenth optical signal into a fifteenth optical signal, and output the fifteenth optical signal.

5. The optical device according to claim 1, further comprising:

a first integrated coherent receiver (ICR), configured to receive a first optical carrier; and perform coherent detection on the eleventh optical signal and the first optical carrier to obtain a first coherent detection signal;

a first analog-to-digital converter (ADC), configured to perform analog-to-digital conversion on the first coherent detection signal to obtain a first digital signal;

a second ICR, configured to receive a second optical carrier, and perform coherent detection on the twelfth optical signal and the second optical carrier to obtain a second coherent detection signal;

a second ADC, configured to perform analog-to-digital conversion on the second coherent detection signal to obtain a second digital signal; and a processor, configured to process the first digital signal and the second digital signal.

6. The optical device according to claim 5, wherein the at least three optical signals further comprise a sixteenth optical signal, and the optical device further comprises:

a third ICR, configured to receive a third optical carrier, and perform coherent detection on the sixteenth optical signal and the third optical carrier to obtain a third coherent detection signal;

a third ADC, configured to perform analog-to-digital conversion on the third coherent detection signal to obtain a third digital signal; and the processor, further configured to process the third digital signal.

7. An optical device, comprising:

a first optical splitter, configured to split a light source with a frequency f0, to form at least three optical signals; wherein the at least three optical signals comprise a first optical signal; a second optical signal, and a third optical signal;

a first Mach-Zehnder MZ modulator, configured to drive the first optical signal based on a first clock signal $\cos(2\pi ft)$ to modulate the first optical signal, to output a fourth optical signal, wherein f represents a frequency of the first clock signal;

a second MZ modulator, configured to drive the second optical signal based on a second clock signal $\sin(2\pi ft)$ to modulate the second optical signal, to output a fifth optical signal;

a first optical coupler, configured to couple the fourth optical signal and the fifth optical signal to output a sixth optical signal and a seventh optical signal;

a second optical splitter, configured to split the third optical signal into an eighth optical signal and a ninth optical signal;

a first power regulator and a first phase shifter, configured to perform respectively power adjustment and phase shifting on the eighth optical signal to output a tenth optical signal;

a second power regulator and a second phase shifter, configured to perform respectively power adjustment and phase shifting on the ninth optical signal to output an eleventh optical signal;

a second optical coupler, configured to combine the sixth optical signal and the tenth optical signal, to output a twelfth optical signal with a frequency f0+f and cancel a residual signal of the sixth optical signal at f0; and a third optical coupler, configured to combine the seventh optical signal and the eleventh optical signal, to output a thirteenth optical signal with a frequency f0−f and cancel a residual signal of the seventh optical signal at f0.

8. The optical device according to claim 7, wherein the first clock signal and the second clock signal are generated by a same clock source, or the first clock signal and the second clock signal are generated by two phase synchronized clock sources.

9. The optical device according to claim 7, further comprising:

a first modulator, configured to modulate the twelfth optical signal;

a second modulator, configured to modulate the thirteenth optical signal; and a fourth optical coupler, configured to couple the modulated twelfth optical signal and the modulated thirteenth optical signal into a fourteenth optical signal, and output the fourteenth optical signal.

10. The optical device according to claim 7, wherein the at least three optical signals further comprise a fifteenth optical signal, and the optical device further comprises:

a third modulator, configured to modulate the twelfth optical signal;

a fourth modulator, configured to modulate the thirteenth optical signal;

a fifth modulator, configured to modulate the fifteenth optical signal; and a fifth optical coupler, configured to couple the modulated twelfth optical signal, the modulated thirteenth optical signal, and the modulated fifteenth optical signal into a sixteenth optical signal, and output the sixteenth optical signal.

11. The optical device according to claim 7, further comprising:

a first integrated coherent receiver (ICR), configured to receive a first optical carrier, and perform coherent detection on the twelfth optical signal and the first optical carrier to obtain a first coherent detection signal;

a first analog-to-digital converter (ADC), configured to perform analog-to-digital conversion on the first coherent detection signal to obtain a first digital signal;

a second ICR, configured to receive a second optical carrier, and perform coherent detection on the thirteenth optical signal and the second optical carrier to obtain a second coherent detection signal;

a second ADC; configured to perform analog-to-digital conversion on the second coherent detection signal to obtain a second digital signal; and a processor, configured to process the first digital signal and the second digital signal.

12. The optical device according to claim 11, wherein the at least three optical signals further comprise a seventeenth optical signal, and the optical device further comprises:

a third ICR, configured to receive a third optical carrier, and perform coherent detection on the seventeenth optical signal and the third optical carrier to obtain a third coherent detection signal;

a third ADC, configured to perform analog-to-digital conversion on the third coherent detection signal to obtain a third digital signal; and the processor, further configured to process the third digital signal.

13. An optical signal processing method, comprising:
    splitting a light source with a frequency f0, to form at least three optical signals, wherein the at least three optical signals comprise a first optical signal, a second optical signal, and a third optical signal;
    driving the first optical signal based on a first clock signal $\cos(2\pi ft)$ to modulate the first optical signal, to obtain a fourth optical signal, wherein f represents a frequency of the first clock signal;
    driving the second optical signal based on a second clock signal $\sin(2\pi ft)$ modulate the second optical signal, to obtain a fifth optical signal;
    coupling the fourth optical signal and the fifth optical signal to obtain a sixth optical signal and a seventh optical signal;
    performing power adjustment and phase shifting on the third optical signal to obtain an eighth optical signal;
    splitting the eighth optical signal into a ninth optical signal and a tenth optical signal;
    combining the sixth optical signal and the ninth optical signal, to obtain an eleventh optical signal with a frequency f0+f and cancel a residual signal of the sixth optical signal at f0; and
    combining the seventh optical signal and the tenth optical signal, to obtain a twelfth optical signal with a frequency f0−f and cancel a residual signal of the seventh optical signal at f0.

14. The method according to claim 13, wherein the first clock signal and the second clock signal are generated by a same clock source, or the first clock signal and the second clock signal are generated by two phase synchronized clock sources.

15. The method according to claim 13, further comprising:
    modulating the eleventh optical signal;
    modulating the twelfth optical signal; and
    coupling the modulated eleventh optical signal and the modulated twelfth optical signal into a thirteenth optical signal, and outputting the thirteenth optical signal.

16. The method according to claim 13, wherein the at least three optical signals further comprise a fourteenth optical signal, and the method further comprises:
    modulating the eleventh optical signal;
    modulating the twelfth optical signal;
    modulating the fourteenth optical signal; and
    coupling the modulated eleventh optical signal, the modulated twelfth optical signal, and the modulated fourteenth optical signal into a fifteenth optical signal, and outputting the fifteenth optical signal.

17. The method according to claim 13, further comprising:
    receiving a first optical carrier, and performing coherent detection on the eleventh optical signal and the first optical carrier to obtain a first coherent detection signal;
    performing analog-to-digital conversion on the first coherent detection signal to obtain a first digital signal;
    receiving a second optical carrier, and performing coherent detection on the twelfth optical signal and the second optical carrier to obtain a second coherent detection signal;
    performing analog-to-digital conversion on the second coherent detection signal to obtain a second digital signal; and
    processing the first digital signal and the second digital signal.

18. The method according to claim 17, wherein the at least three optical signals further comprise a sixteenth optical signal, and the method further comprises:
    receiving a third optical carrier, and performing coherent detection on the sixteenth optical signal and the third optical carrier to obtain a third coherent detection signal;
    performing analog-to-digital conversion on the third coherent detection signal to obtain a third digital signal; and
    processing the third digital signal.

* * * * *